(12) United States Patent
Inaba

(10) Patent No.: US 8,872,610 B2
(45) Date of Patent: Oct. 28, 2014

(54) REACTOR, AND COIL COMPONENT

(75) Inventor: Kazuhiro Inaba, Osaka (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 0 days.

(21) Appl. No.: 13/808,209

(22) PCT Filed: Jul. 5, 2011

(86) PCT No.: PCT/JP2011/065334
§ 371 (c)(1),
(2), (4) Date: Jan. 3, 2013

(87) PCT Pub. No.: WO2012/008329
PCT Pub. Date: Jan. 19, 2012

(65) Prior Publication Data
US 2013/0107580 A1   May 2, 2013

(30) Foreign Application Priority Data

Jul. 13, 2010   (JP) .................................. 2010-159159
Jul. 4, 2011    (JP) .................................. 2011-148681

(51) Int. Cl.
*H01F 27/02*   (2006.01)
(52) U.S. Cl.
USPC .......................................................... 336/96
(58) Field of Classification Search
USPC .................. 336/65, 83, 200, 232–234, 90, 96
See application file for complete search history.

(56) References Cited

U.S. PATENT DOCUMENTS

2012/0256571 A1 * 10/2012 Ang ........................... 318/400.3

FOREIGN PATENT DOCUMENTS

| JP | 59089556 A | * | 5/1984 |
| JP | 2003-168610 | | 6/2003 |
| JP | 2006-004957 | | 1/2006 |
| JP | 2006-261331 | | 9/2006 |
| JP | 2009-033051 | | 2/2009 |
| JP | 2009218293 A | * | 9/2009 |
| JP | 4535300 | | 6/2010 |

* cited by examiner

*Primary Examiner* — Tuyen Nguyen
(74) *Attorney, Agent, or Firm* — Venable LLP; Michael A. Sartori; F. Brock Riggs

(57) ABSTRACT

Provided are a coil component capable of contributing to improving productivity of a reactor, and a reactor exhibiting good productivity. A reactor 1A includes one coil 2 formed by spirally winding a wire 2w, and a magnetic core 3, which is disposed inside and outside the coil 2 and which forms a closed magnetic circuit. The magnetic core 3 includes an inner core portion 31 disposed inside the coil 2, and an outer core portion 32 disposed around the coil 2. The coil 2 and the inner core portion 31 constitute a coil component 2A held as an integral unit by a resin molded portion 20. A shape of the coil 2 is maintained by the resin molded portion 20. Since the coil component 2A includes a portion of the magnetic core 3, the number of components can be reduced, and the coil 2 and the inner core portion 31 can be easily placed into a case 4A when they are housed therein. The coil 2 is easier to handle because the coil shape is constantly maintained without expanding or contracting. Workability in assembly of the reactor 1A is improved by employing the coil component 2A.

7 Claims, 7 Drawing Sheets (A)

(B)

REACTOR, AND COIL COMPONENT

TECHNICAL FIELD

The present invention relates to a reactor used as a component of a power conversion device, e.g., a vehicle-loaded Direct Current (DC)-DC converter, a coil component utilized as one component of the reactor, a converter including the reactor, and a power conversion device including the converter. More particularly, the present invention relates to a reactor having good assembly workability.

BACKGROUND ART

There is a reactor as one of parts of a circuit for performing operations of stepping-up and -down a voltage. In one form of a reactor employed, for example, in a converter that is loaded on a vehicle such as a hybrid car, a pair of coils, each formed by spirally winding a wire, are disposed side by side around respective portions of a magnetic core having a annular shape, e.g., an O-like shape.

A small reactor including only one coil is also known like a reactor disclosed in Patent Literature (PTL) 1. Such a reactor includes, as illustrated in FIG. 1 of PTL 1, the so-called pot type core, i.e., a magnetic core including a columnar inner core portion arranged inside a coil, a cylindrical core portion covering substantially an entire outer peripheral surface of the coil, and a pair of disk-shaped core portions arranged at respective end surfaces of the coil. In the pot type core, the concentrically-arranged inner core portion and cylindrical core portion are coupled to each other by the disk-shaped core portions, thereby forming a closed magnetic circuit.

CITATION LIST

Patent Literature

PTL 1: Japanese Unexamined Patent Application Publication No. 2009-033051

SUMMARY OF INVENTION

Technical Problem

An improvement of assembly workability is demanded for the above-described reactor including the pot type core.

The reactor of PTL 1 includes a larger number of parts and is inferior in assembly workability because the coils and the individual core portions constituting the pot type core are independent members.

Furthermore, the coil formed by spirally winding the wire is capable of expanding and contracting and its shape is instable in a free state, thus giving rise to a difficulty in handling of the coil. That point also makes the assembly workability inferior. In particular, because a vehicle-loaded part is demanded to be smaller, the coil is also demanded to be held in a state compressed in its axial direction from the viewpoint of preventing the coil length in the axial direction from being increased due to spring-back. However, providing an additional member to maintain the compressed state increases the number of parts and the number of steps. That point further makes the assembly workability inferior.

Insulation between the coil and the magnetic core can be enhanced by arranging an insulator between the coil and the magnetic core, as described in PTL 1. However, the provision of the insulator increases the number of parts and the number of steps. That point still further makes the assembly workability inferior.

Accordingly, one object of the present invention is to provide a reactor having good assembly workability. Another object of the present invention is to provide a coil component that contributes to improving the assembly workability of the reactor. Still another object of the present invention is to provide a converter including the reactor and a power conversion device including the converter.

Solution to Problem

The present invention achieves the above object by holding a coil and a component constituting a part of a magnetic core as an integral unit with an insulating resin, and further by holding a shape of the coil with the insulating resin.

The coil component of the present invention is a reactor component for use in a reactor including a magnetic core arranged inside and outside a coil, the coil component comprising one coil formed by spirally winding a wire, an inner core portion constituting one part of the magnetic core and inserted within the coil, and a resin molded portion made of an insulating resin. The resin molded portion covers at least a part of a surface of the coil, thereby holding a shape of the coil and holding the coil and the inner core portion integrally with each other.

The reactor of the present invention is a reactor including a magnetic core arranged inside and outside a coil, the reactor including the above-described coil component of the present invention, which comprises the coil, the inner core portion, and the resin molded portion. More specifically, the reactor of the present invention comprises one coil formed by spirally winding a wire, an inner core portion constituting one part of the magnetic core and inserted within the coil, a resin molded portion made of an insulating resin and covering at least a part of a surface of the coil, thereby holding a shape of the coil and holding the coil and the inner core portion integrally with each other, and an outer core portion constituting the other part of the magnetic core and disposed around the coil to form a closed magnetic circuit in cooperation with the inner core portion.

According to the coil component of the present invention, since the coil and the inner core portion, the latter being a component utilized as the magnetic core of the reactor, are integrated with each other, the number of components of the reactor can be reduced in comparison with the case where the coil and the inner core portion are separate members. Furthermore, since the shape of the coil is held by the insulating resin, the coil component of the present invention is easier to handle and does not need a separate member for holding the shape of the coil. According to the coil component of the present invention, since the insulating resin can be utilized to function as an electrical insulator between the coil and the magnetic core, an additional insulator can be dispensed with. Moreover, since the resin filled into between the coil and the inner core portion in the coil component of the present invention and holding the coil and the inner core portion with each other functions also as a member for positioning the inner core portion relative to the coil, an additional positioning member is not required. As a result of those points, the reactor can be easily assembled by employing the coil component of the present invention, and the coil component of the present invention can contribute to improving workability in assembly of the reactor.

In addition, according to the coil component of the present invention, the coil component has a small size because of including one coil, and the coil can be held in a compressed state by a resin constituting the resin molded portion. In that case, a length of the coil in its axial direction can be shortened. As a result of those points, the coil component of the present invention can contribute to reducing a size of the reactor.

Because of including the coil component of the present invention in which the coil and the inner core portion are held integrally with each other by the resin molded portion as described above, the reactor of the present invention can be easily assembled and has good assembly workability. Even when the reactor of the present invention includes a metal-made case and the coil component of the present invention is housed in the case, insulation between the coil and the case can be enhanced by disposing the resin of the resin molded portion, which covers an outer periphery of the coil, to be interposed between the coil and the case. Furthermore, the reactor capable of efficiently transferring heat of the coil to the coil and having a good heat dissipation effect can be obtained by contacting the coil with the metal-made case with the resin of the resin molded portion interposed therebetween. In addition, according to the reactor of the present invention, insulation between the coil and the outer core portion can also be enhanced with the presence of the resin of the resin molded portion.

In respective one forms of the reactor of the present invention and the coil component of the present invention, at least one end surface of the inner core portion is covered with a resin constituting the resin molded portion.

The insulating resin is usually a nonmagnetic material having a relative magnetic permeability of about 1. In the above-described form, therefore, the resin covering the end surface of the inner core portion (called an end-surface covering resin hereinafter) can be utilized to function as a gap member. Thus, an inductance (gap length) of the reactor can be easily adjusted in the above-described form by adjusting a thickness of the end-surface covering resin. The end-surface covering resin can further mechanically protect the inner core portion.

In respective one forms of the reactor of the present invention and the coil component of the present invention, parts of lead-out portions of the wire, which are led out from a turn forming portion of the coil, are covered with insulating tubes. Those parts of the lead-out portions correspond to, for example, regions where the lead-out portions are contacted with the outer core portion.

According to the above-described form, since the parts of the lead-out portions are also covered with insulating materials, insulation between the lead-out portions and the outer core portion can be enhanced even when the lead-out portions are contacted with the magnetic core of the reactor, particularly with the outer core portion. Furthermore, according to the above-described form, since the resin molded portion is typically just required to be formed to cover only the turn forming portion of the coil and the lead-out portions are not required to be covered with the resin molded portion, a shape of the resin molded portion is comparatively simple, thus resulting easier molding and higher productivity.

In respective one forms of the reactor of the present invention and the coil component of the present invention, the inner core portion is formed of a powder compact.

A powder compact, which is formed by compacting magnetic powder under pressure, can be easily compacted into even a complicated three-dimensional shape. By employing the pressure compact to form at least the inner core portion, therefore, it is possible to easily form the inner core portion having an outer shape that is, for example, analogous to an inner peripheral shape of the coil. When the inner core portion has the analogous outer shape following the inner peripheral surface of the coil, an outer peripheral surface of the inner core portion and the inner peripheral surface of the coil can be positioned close to each other. Accordingly, the above-described form can reduce the size of the coil component and hence can contribute to reducing the size of the reactor. Moreover, when the outer peripheral surface of the inner core portion has the shape analogous to the inner peripheral surface of the coil, the resin of the resin molded portion can be uniformly filled between the inner peripheral surface of the coil and the outer peripheral surface of the inner core portion. Thus, in the above-described form, the inner core portion can be arranged at an appropriate position within the coil. In addition, the powder compact is easier to increase a saturation magnetic flux density than a later-described molded and hardened body that is made of a mixture containing magnetic powder and resin.

In one form of the reactor of the present invention, at least a part of the outer core portion is made of a mixture containing magnetic powder and resin.

The reactor in the above-described form can be typically manufactured by placing the coil component of the present invention in a case or a mold, filling a mixed fluid of magnetic powder and unhardened resin into the case or the mold, and then hardening the resin. In particular, the mixed is molded such that the mixture after being hardened (called a molded and hardened body) constitutes the outer core portion, which forms a closed magnetic circuit in cooperation with the inner core portion included in the coil component. Thus, the above-described form enables the reactor to be manufactured at the same time as when the outer core portion is molded. Furthermore, according to the above-described form, since the inner core portion and the outer core portion can be integrated with each other by the resin of the molded and hardened body, a step of bonding both the core portions and a bonding material (e.g., an adhesive or an adhesive tape) are not required, whereby the number of components and the number of steps can be reduced. Moreover, by employing the molded and hardened body, the outer core portion having the desired shape can be more easily molded than the case employing a stack of electric steel sheets or a powder compact. As a result of those points, the reactor in the above-described form has good productivity. In addition, according to the above-described form, since a mixing ratio of the magnetic powder and the resin can be easily changed, it is easier to form the outer core portion having the desired magnetic characteristics (mainly inductance), and hence to form the reactor of the present invention, which includes the outer core portion having the desired magnetic characteristics.

The magnetic core used in the reactor can be practiced in various forms, such as a stack formed by stacking a plurality of electric steel sheets, the above-mentioned powder compact, the above-mentioned molded and hardened body, and a combination of the formers (called a hybrid core hereinafter). For example, the inner core portion and the outer core portion may be both formed of the powder compacts, or the hybrid core may be formed using different materials for both the core portions as in the above-described form. In the hybrid core, magnetic characteristics of both the core portions can also be made different from each other. For example, when appropriate materials are selected such that the inner core portion has a higher saturation magnetic flux density than the outer core portion, a sectional area of the inner core portion can be reduced in comparison with a magnetic core in which the saturation magnetic flux density is uniform over the entire magnetic core. With a reduction of the sectional area of the inner core portion, a circumferential length of the coil can also be shortened. Therefore, the above-described form can contribute to reducing the size, weight, and loss.

Alternatively, when appropriate materials are selected such that the outer core portion has a lower magnetic permeability than the inner core portion, it is possible to realize a gapless structure, or to further reduce the size of the inner core portion. Herein, typical magnetic materials used for a magnetic core of a reactor have correlation between the saturation magnetic flux density and the relative magnetic permeability. In many cases, a magnetic material having a higher saturation magnetic flux density has a higher relative magnetic permeability. Accordingly, when the saturation magnetic flux density of the entire magnetic core is high, the relative magnetic permeability also tends to become high. Thus, the magnetic core is required to include a gap for inhibiting saturation of magnetic flux, e.g., a gap member made of a material having a lower magnetic permeability than the magnetic core, typically made of a nonmagnetic material, or an air gap. When the gap is included in the magnetic core, it is desired to provide a certain clearance between the inner peripheral surface of the coil and the outer peripheral surface of the inner core portion in order to suppress leakage flux through the gap and to reduce the loss caused upon the leakage flux reaching the coil. In contrast, in the hybrid core in which the relative magnetic permeability of the entire magnetic core is adjusted by making the magnetic permeability different in parts of the magnetic core, the gapless structure can be realized and the core size can be reduced corresponding to omission of the gap. Moreover, since the above-mentioned clearance can be reduced by arranging the coil and the inner core portion closer to each other, a smaller reactor can be obtained. In addition, since the gap member is no longer required by employing the hybrid core, the number of components and the number of steps can be reduced. When the hybrid core is employed, the outer core portion is preferably selected depending on the form of the inner core portion included in the coil component.

In one form of the reactor of the present invention, when at least part of the outer core portion is made of the above-mentioned mixture, lead-out portions of the wire, which are led out from a turn forming portion of the coil, are covered with insulating tubes in regions where the lead-out portions are contacted with the above-mentioned mixture.

When the outer core portion made of the above-mentioned mixture is disposed so as to cover an outer periphery of the coil component of the present invention, the lead-out portions of the wire are contacted with the outer core portion (i.e., the above-mentioned mixture). According to the above-described form, however, since the lead-out portions of the wire, which are contacted with the mixture, are covered with the insulating tubes, insulation between the lead-out portions and the outer core portion can be ensured. Furthermore, according to the above-described form, since the coil component of the present invention can be formed such that the turn forming portion of the coil is covered with the resin molded portion and the lead-out portions are exposed from the resin molded portion, the coil component of the present invention has a simple shape and exhibits higher moldability. Hence, productivity of the reactor can be further increased.

The reactor of the present invention can be suitably employed as a component of a converter. The converter of the present invention comprises a switching element, a drive circuit for controlling operation of the switching element, and a reactor for smoothing the switching operation, the converter converting an input voltage with the operation of the switching element, wherein the reactor is the above-described reactor of the present invention. The converter of the present invention can be suitably employed as a component of a power conversion device. The power conversion device of the present invention comprises a converter for converting an input voltage, and an inverter connected to the converter and inter-converting a direct current and an alternating current, the power conversion device driving a load with electric power converted by the inverter, wherein the converter is the above-described converter of the present invention.

The converter of the present invention and the power conversion device of the present invention include the reactor having good assembly workability and hence exhibit good productivity.

Advantageous Effects of Invention

The reactor of the present invention has good assembly workability. The coil component of the present invention can contribute to improving the assembly workability of the reactor. The converter of the present invention and the power conversion device of the present invention exhibit good productivity because they include the reactor of the present invention, which has good assembly workability.

DESCRIPTION OF EMBODIMENTS

Figure 1:
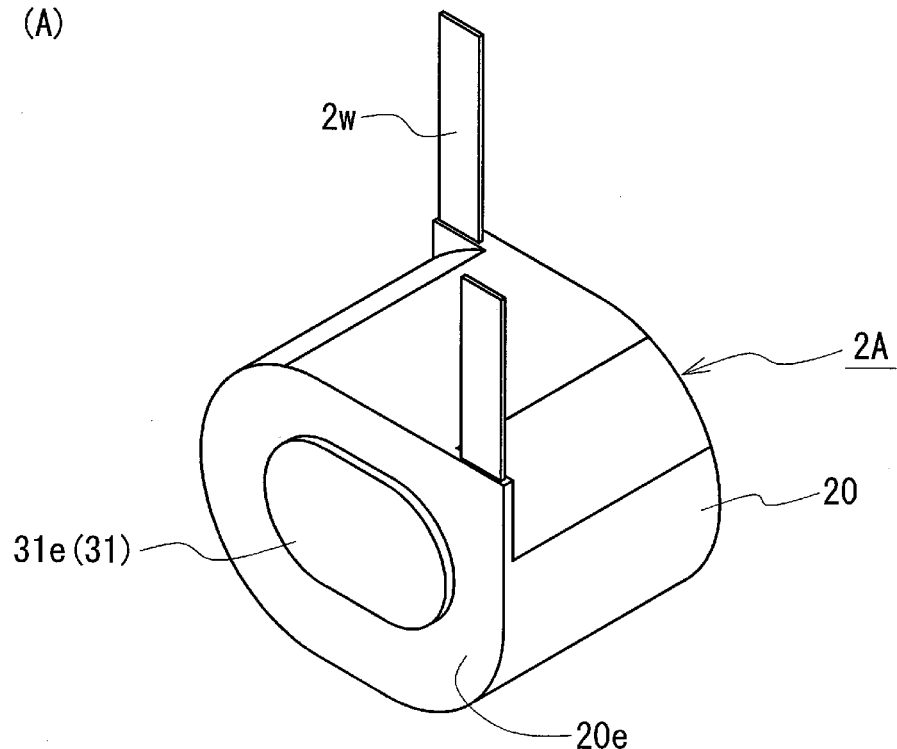
FIG. 1(A) is a schematic perspective view of a coil component according to Embodiment 1.
FIG. 1(B) is a schematic perspective view of a coil and an inner core portion, which are included in the coil component.
Figure 1:
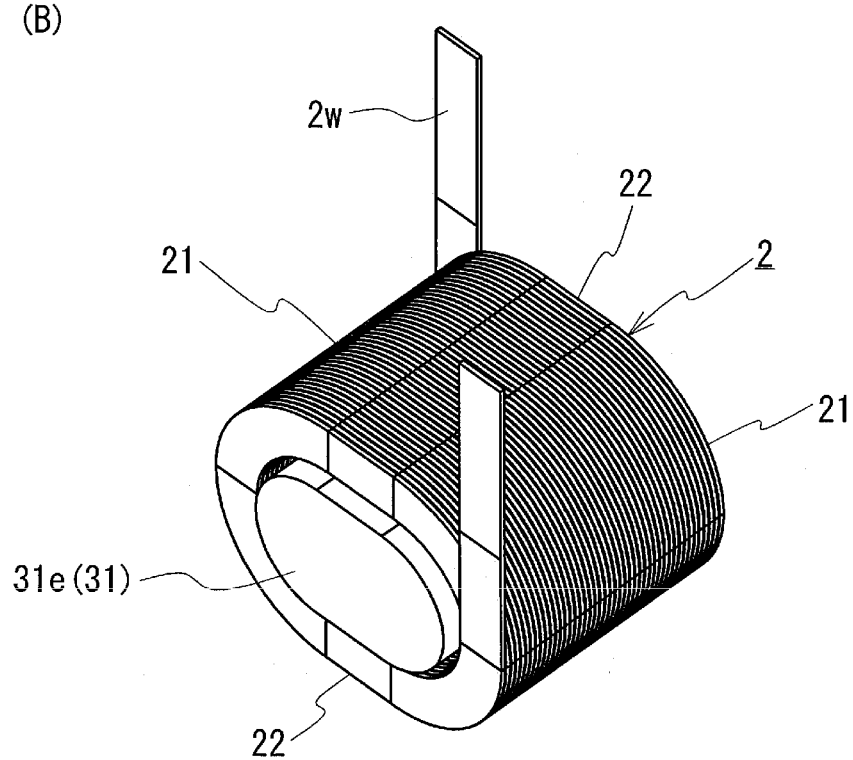

Reactors and coil components according to embodiments will be described below with reference to the drawings. The same symbols in the drawings denote components called by the same names.

Embodiment 1

A coil component 2A of Embodiment 1 is described with reference to FIG. 1. The coil component 2A is a reactor component for use in a reactor including a magnetic core that is disposed inside and outside a coil. The coil component 2A includes one coil 2 formed by spirally winding a wire 2w, an inner core portion 31 inserted within the coil 2 and constituting a part of the magnetic core of the reactor, and a resin molded portion 20. A surface of a turn forming portion of the coil 2 is covered with the resin molded portion 20. The coil component 2A is featured in that a shape of the coil 2 is held by the resin molded portion 20, and that the coil 2 and the inner core portion 31 are integrated with each other by the resin molded portion 20. The individual components will be described in detail below.

[Coil]

(Wire)

The coil 2 is a cylindrical member formed by spirally winding one continuous wire 2w. The wire 2w is preferably a coated wire including a conductor made of a conductive material, such as copper, aluminum or an alloy thereof, and an insulating coating made of an insulating material and formed over an outer periphery of the conductor. The conductor used here can be selected from conductors having various cross-sectional shapes, such as a rectangular wire having a rectangular cross-section, a round wire having a circular cross-section, and a special-form wire having a polygonal cross-section. In particular, because the rectangular wire is easy to form a coil having a high space factor when an edgewise coil is formed by winding the rectangular wire in an edgewise manner, using the rectangular wire is advantageous in more easily obtaining a smaller coil with a higher space factor and contributing to a size reduction of the reactor. The round wire is highly flexible and is easily wound. The insulating material constituting the insulating coating is typically an enamel material, e.g., polyamide-imide. A thickness of the insulating coating is preferably 20 μm or more and 100 μm or less. The insulating coating having a larger thickness is more effective in reducing pin holes and enhancing insulation. The thickness of the insulating coating can be increased, for example, by forming the insulating coating with the enamel material coated in multiple layers. Furthermore, the insulating coating may have a multilayer structure made of different materials. In one example of the multilayer structure, a polyphenylene sulfide layer is formed on an outer periphery of a polyamide-imide layer. The insulating coating of the multilayer structure also provides superior electrical insulation. The number of windings (turns) can be selected as appropriate. The coil having the number of windings of about 30 to 70 can be preferably used as a vehicle-loaded part.

Here, the coil 2 is an edgewise coil (number of windings: 50) formed by edgewise-winding a coated rectangular wire in which a conductor is a rectangular wire (with an aspect ratio (width/thickness) of 5 or more and preferably 10 or more) made of copper and having a rectangular cross-section, and in which the insulating coating is made of enamel.

(End Surface Shape)

An end surface shape of the coil 2 is typically circular. Since the circular coil can be easily formed by winding even when the rectangular wire is used as a winding wire, coil productivity is increased and a smaller coil is easier to realize. Alternatively, the end surface shape of the coil 2 may be a noncircular shape including a curved portion. More specific examples of that end surface shape include (1) a shape formed of substantially only a curved line, and (2) a shape including a curved portion and a linear portion.

(1) The shape formed of substantially only a curved line is, e.g., an ellipse. Because the elliptic coil has a shape close to a true circle and its circumferential length is comparatively short, the length of the wire constituting the coil can be easily shortened. With a reduction in amount of the wire used, therefore, it is possible to reduce the loss, such as copper loss, and the weight.

(2) The shape including a curved portion and a linear portion is, for example, a race track shape made up of a pair of semicircular arc portions and a pair of linear portions each interconnecting the pair of semicircular arc portions, a corner-rounded polygonal shape obtained by rounding corners of a polygon including a tetragon, such as a square or a rectangle, and a special shape obtained by replacing a curved line, which forms a part of the above-mentioned ellipse, with a linear line. In the coil including the linear portion, a surface formed by the linear portion is provided as a flat surface. Therefore, by mounting the coil component in, e.g., a case with such a flat surface positioned on the mounted side, a sufficient area can be ensured for the mounted-side surface of the coil component and good stability is obtained. Moreover, given that an area of the inside of the coil is to be held constant, a shape including the curved portion tends to have a shorter circumferential length than a shape including only the linear portion. Thus, the shape including the curved portion can reduce, as described above, the amount of the wire used, the loss such as the copper loss, and the weight. In addition, the shape including the curved portion enables the coil to be more easily formed.

Particularly, the coil having the race track shape can form an edgewise coil even when the rectangular wire is used as the wire, thus providing a smaller coil with a higher space factor. Furthermore, because of including the curved portion (semicircular arc portion) having a larger bend radius than that in the coil having the corner-rounded polygonal shape, the coil having the race track shape can be more easily formed into an edgewise coil and hence exhibits higher productivity. In particular, when the coil having the race track shape is fabricated in such a form that the length of the linear portion is increased and the distance between the pair of the linear portions is reduced, i.e., in a form having a large aspect ratio (major axis/minor axis), the area of the above-mentioned surface on the mounted side, which is defined by the linear portion, is increased. A horizontally long coil having the aspect ratio of about 1.1 to 2 is preferably from the view of increasing the area of the surface on the mounted side and reducing the height of the coil.

Here, as illustrated in FIG. 1(B), the end surface shape of the coil 2 (the end surface shape being the same as the cross-sectional shape of the coil 2 when cut along a plane perpendicular to the axial direction of the coil 2) is a shape including the curved portion and the linear portion. More specifically, the coil 2 has a race track shape made up of a pair of linear portions 22 arranged in parallel, and a pair of semicircular arc portions 21 arranged to interconnect ends of the linear portions 22. Here, the aspect ratio (major axis/minor axis) of the coil 2 is set to about 1.3. Each semicircular arc portion 21 has a comparatively large bend radius, and it is a curved portion with moderate bending. Therefore, that end surface shape facilitates the edgewise winding of the wire. With that end surface shape, an outer peripheral surface and an inner peripheral surface of the coil 2 are made up of curved surfaces defined by the semicircular arc portions 21 and flat surfaces defined by the linear portions 22.

(Wire End Portions)

As illustrated in FIG. 1(B), the wire 2w forming the coil 2 has lead-out portions extending from the turn forming portion of the coil 2 over appropriate lengths. Terminal members (not illustrated) made of a conductive material, e.g., copper or aluminum, are each connected to the conductor of the wire 2w, which is exposed by peeling off the insulating coating in each of both end portions of the wire 2w. An external device (not illustrated), such as a power supply for supplying electric power to the coil 2, is connected to the coil 2 through the terminal members. Welding, such as Tungsten Inert Gas (TIG) welding, pressure-bonding, etc. can be employed to connect the conductor of the wire 2w and each terminal member. In an example illustrated in FIG. 1, both the end portions of the wire 2w are led out perpendicularly to the axial direction of the coil 2, but the leading-out direction of both the end portions can be selected as appropriate. For example, both the end portions of the wire 2w may be led out parallel to the axial direction of the coil 2 as in a coil component 2C of Embodiment 3 described later. Alternatively, they may be led out in different directions.

[Inner Core Portion]

The inner core portion 31 is a columnar member having a race track-like outer shape following the inner peripheral shape of the coil 2. While the inner core portion 31 is here a solid member entirely formed of a powder compact without including a gap member or an air gap, it may have a form including a gap member made of a nonmagnetic material, e.g., an aluminum plate, or an air gap.

The powder compact is typically obtained by compacting soft magnetic powder having an insulating coating made of, e.g., a silicone resin on a surface thereof, or a powder mixture of the soft magnetic powder and a binder added to and mixed with the former as appropriate, and then by firing the compacted powder at a temperature lower than the heat resistant temperature of the insulating coating. When fabricating the powder compact, its saturation magnetic flux density can be changed by selecting the material of the soft magnetic powder, by adjusting a mixing ratio between the soft magnetic powder and the binder, amounts of various types of coatings including the insulating coating, etc., or by controlling compacting pressure. The powder compact having a higher saturation magnetic flux density can be obtained, for example, by employing the soft magnetic powder having a higher saturation magnetic flux density, by reducing an amount of the mixed binder to increase a proportion of the soft magnetic material, or by raising the compacting pressure.

Examples of the soft magnetic powder include powders made of iron-based materials, e.g., iron-group metals such as Fe, Co, Ni, etc., and Fe-based alloy materials containing Fe as a main ingredient, such as Fe—Si, Fe—Ni, Fe—Al, Fe—Co, Fe—Cr, Fe—Si—Al, etc., rare-earth metal powders, and ferrite powder. In particular, the Fe-based materials can more easily provide a magnetic core having a higher saturation magnetic flux density than the case using ferrite. The insulating coating formed on the soft magnetic powder can be made of, e.g., a phosphate compound, a silicon compound, a zirconium compound, an aluminum compound, or a boron compound. The insulating coating made of such a compound can effectively reduce the eddy current loss particularly when a magnetic particle constituting the magnetic powder is made of a metal, e.g., an iron group metal or a Fe-based alloy. The binder can be made of, e.g., a thermoplastic resin, a non-thermoplastic resin, or a higher fatty acid. The binder disappears or changes to an insulator, e.g., silica, with the above-mentioned firing. In the powder compact, because an insulator, e.g., the insulating coating, exists between magnetic particles, the magnetic particles are insulated from each other and the eddy current loss can be reduced. Accordingly, even when high-frequency power is supplied to the coil, the eddy current loss can be held small. The powder compact may be prepared by utilizing suitable one of known products.

Here, the inner core portion 31 is constituted by a powder compact that is made of the soft magnetic material having a coating, e.g., an insulating coating, and it has the saturation magnetic flux density of 1.6 T or more and the relative magnetic permeability of 100 to 500.

In the example illustrated in FIG. 1, a length of the inner core portion 31 in the axial direction of the coil 2 (referred to simply as a length hereinafter) is longer than that of the coil 2, and both end surfaces 31e of the inner core portion 31 and the vicinities thereof slightly project respectively from corresponding end surfaces of the coil 2 in the state where the inner core portion 31 is inserted within the coil 2 (FIG. 1(B)). A length by which the inner core portion 31 projects from the coil 2 can be optionally selected. While lengths by which the inner core portion 31 projects from both the ends of the coil 2 are the same here, the projection lengths may be different from each other as in Embodiment 3 described later. Furthermore, the length of the inner core portion 31 and the layout thereof relative to the coil may be adjusted such that the inner core portion 31 projects from only one end surface of the coil 2. In another form, the length of the inner core portion may be equal to that of the coil, or the length of the inner core portion may be shorter than that of the coil. In the latter case, the coil component can be easily formed by covering one end surface 31e of the inner core portion 31 with the resin molded portion 20 as in Embodiment 3 described later.

[Resin Molded Portion]

The resin molded portion 20 has the function of holding the coil 2 in a constant shape. In the coil component 2A, therefore, the coil 2 is kept from expanding and contracting with the presence of the resin molded portion 20. From that point of view, a shape of the resin molded portion 20 is a matter of choice insofar as the resin molded portion 20 can hold the coil in a constant shape to such as extent as not allowing expansion and contraction thereof. Here, the resin molded portion 20 covers the whole of the turn forming portion of the coil 2 (i.e., the inner peripheral surface, the outer peripheral surface, and the pair of end surfaces thereof) except for the lead-out portions of the wires 2w, which constitutes the coil 2, extending from the turn forming portion (i.e., in FIG. 1, linearly extending wire portions including regions to which the above-mentioned terminal members are connected), thereby forming an outer peripheral surface and parts of end surfaces of the coil component 2A. A region of the coil 2, which is covered with the resin molded portion 20, can be optionally selected. For example, the turn forming portion of the coil 2 may be partly exposed without being covered with the resin molded portion 20. However, an insulator, e.g., a resin constituting the resin molded portion 20, can be caused to reliably exist between the coil 2 and the inner core portion 31 by covering substantially the entire surface of the turn forming portion of the coil 2 as in this embodiment. Furthermore, when the reactor is assembled using the coil component 2A, it is possible to ensure insulation between the turn forming portion of the coil 2 and the magnetic core arranged around the coil 2. While a thickness of the resin molded portion 20 is set substantially uniform here, it can be optionally selected so as to satisfy the desired insulation characteristic. The thickness of the resin molded portion 20 is, for example, about 1 mm to 10 mm.

The resin molded portion 20 further has the function of holding the coil 2 and the inner core portion 31 in an integral form. From that point of view, the shape of the resin molded portion 20 is a matter of choice insofar as the resin molded portion 20 can hold the coil 2 and the inner core portion 31 in an integral form. Here, the inner core portion 31 is housed in the coil 2 in a state leaving, between an outer peripheral surface of the inner core portion 31 and the coil 2, a spacing that is necessary for insulation. In other words, a clearance is present between the inner peripheral surface of the coil 2 and the outer peripheral surface of the inner core portion 31, and the resin of the resin molded portion 20 is filled to bury the clearance. Furthermore, because the coil 2 and the inner core portion 31 are coaxially arranged here and the clearance is formed in a uniform size along the circumferential direction of the inner core portion 31, the resin constituting the resin molded portion 20 and filled in that clearance also has a uniform thickness. The resin filled in that clearance holds the inner core portion 31 at an appropriate position within the coil 2. The inner core portion 31 is integrated with the coil 2 by the resin of the resin molded portion 20 in such a state that its both end surfaces 31e and the vicinities thereof are exposed without being covered with the resin of the resin molded portion 20 and they project respectively from end surfaces 20e of the resin molded portion 20.

Here, the resin molded portion 20 still further has the function of holding the coil 2 in a state compressed from a free-length state. Therefore, the length of the coil 2 included in the coil component 2A is shorter than the free length thereof.

The resin of the resin molded portion 20 can be preferably made of an insulating material, which has heat resistance against temperature of the coil component 2A in use (i.e., heat resistance at such an level that the insulating material is not softened at a maximum reachable temperature of the coil 2 and the magnetic core during use in the reactor), and which can be molded by transfer molding or injection molding. For example, thermosetting resins, such as an epoxy resin, a silicone resin, and unsaturated polyester, or thermoplastic resins, such as a polyphenylene sulfide (PPS) resin and a liquid crystal polymer (LCP), can be preferably used. Furthermore, a coil component exhibiting higher insulation and having a good heat dissipation effect with more efficient dissipation of heat from the coil 2 can be obtained by employing, as the resin of the resin molded portion 20, a resin mixed with filler that is made of at least one type of ceramics selected from silicon nitride, alumina, aluminum nitride, boron nitride, and silicon carbide. In particular, a resin having thermal conductivity of 1 W/m·K or more, preferably 2 W/m·K or more, is desired. Here, an epoxy resin (thermal conductivity of 2 W/m·K) containing filler is employed.

[Method of Manufacturing Coil Component]

The above-described coil component 2A including the inner core portion 31 in an integral form can be manufactured, for example, by employing a manufacturing method described in Japanese Unexamined Patent Application Publication No. 2009-218293. In more detail, a mold capable of opening and closing and including a plurality of rod-like members, which are movable back and forth inside the mold, is prepared. After arranging the coil 2 and the inner core portion 31 within the mold, the coil 2 is pressed by the rod-like members into a compressed state. In the compressed state, the resin constituting the resin molded portion 20 is poured into the mold and then solidified. A method of molding the resin can be practiced by injection molding, transfer molding, or cast molding.

Alternatively, a holding member capable of holding the coil in a compressed state may be separately prepared and, after attaching the holding member to the coil and placing the coil in the compressed state into a mold, the holding member may be fixed to the mold, to thereby hold the coil in the compressed state within the mold. The holding member is preferably constituted to be removable for reuse.

In the coil 2, it is preferable to appropriately arrange an insulating member, such as insulating paper, an insulating tape (e.g., a polyimide tape), or an insulating film (e.g., a polyimide film), or to coat an insulating material by dip coating, or to fit an insulating tube (described later) over each of the lead-out portions of the wire 2w, which are not covered with the resin molded portion 20 (except for regions connected to the terminal members). For example, when a voltage is applied to the coil having 50 turns as the number of windings, a voltage of about 600 V to 700 V may be applied to the lead-out portions even with a voltage between turns being about 12 V to 14 V. In view of such a point, insulation between the lead-out portions and the outer core portion 32 can be ensured by covering the lead-out portions with the insulating material. Of course, the lead-out portions may be covered with the resin molded portion 20.

[Layout]

Here, the coil component 2A is arranged in layout where the flat surface defined by the linear portion 22 becomes the surface on the mounted side, i.e., layout where the axial direction of the coil 2 is positioned horizontally. In this embodiment, the resin molded portion 20 is formed along the flat surface defined by each linear portion 22 of the coil 2, and the surface of the coil component 2A on the mounted side is also formed as a flat surface. Accordingly, the coil component 2A has a sufficient contact area with respect to, e.g., the case. Hence the coil component 2A has good stability when mounted in, e.g., the case. In addition, the coil component 2 may be mounted in layout where the axial direction of the coil 2 is vertically positioned as in Embodiment 3 described later.

Advantageous Effects

With the coil component 2A, since the coil 2 and the inner core portion 31 are integrated with each other by the resin molded portion 20, the coil 2 and the inner core portion 31 can be handled as an integral unit, and the number of components of the reactor can be reduced in comparison with the case where the coil 2 and the inner core portion 31 are separate members. Furthermore, with the coil component 2A, since the shape of the coil 2 is held by the resin molded portion 20, the coil 2 is easier to handle. Thus, the coil component 2A can be, for example, placed into the case or carried with ease and can contribute to improving workability in assembly of the reactor.

Since the coil component 2A further includes the inner core portion 31 in an integral form, the coil 2 and the inner core portion 31 can be integrated with each other at the same time as the molding of the resin molded portion 20, whereby the number of steps can be reduced. That point also contributes to improving the productivity of the reactor.

With the coil component 2A, since substantially only the resin of the resin molded portion 20 is present between the inner peripheral surface of the coil 2 and the outer peripheral surface of the inner core portion 31, any conductive material is substantially not present therebetween, whereby insulation between the coil 2 and the inner core portion 31 can be effectively enhanced. Therefore, additional insulator is not necessary. That point further contributes to improving the productivity of the reactor.

Moreover, since the coil component 2A holds the coil 2 in the compressed state, the length of the coil 2 in the axial direction thereof can be shortened, thus contributing to the size reduction of the reactor. If the coil 2 and the inner core portion 31 are separate members without being integrated with each other by the resin molded portion 20, it is required to form a hollow hole in the resin molded portion for insertion of the inner core portion 31 and to provide a clearance between the inner core portion 31 and a wall of the hollow hole in consideration of easiness in inserting the inner core portion 31. In contrast, in the coil component 2A in which the coil 2 and the inner core portion 31 are integrated with each other by the resin molded portion 20, such a clearance is not required and the size of the reactor can be reduced correspondingly to the absence of that clearance.

In addition, with the coil component 2A, since the inner core portion 31 is formed of the power compact, the inner core portion 31 having a complicated three-dimensional shape, i.e., a columnar member having an outer shape like a race track following the inner peripheral shape of the coil 2, can be easily formed, whereby good productivity is obtained. Still further, since the inner core portion 31 is formed of the powder compact, magnetic characteristics, including the saturation magnetic flux density, can be easily adjusted.

Embodiment I

A reactor 1A of Embodiment I will be described below with reference to FIGS. 2 to 4. The reactor 1A includes one coil 2 formed by winding a wire 2w, a magnetic core 3 arranged inside and outside the coil 2 and forming a closed magnetic circuit, and a case 4A for housing an assembly of the coil 2 and the magnetic core 3. The reactor 1A is practically used in a state installed to an installation target, e.g., a cooling base (here, the case 4A is fixed to the installation target). The magnetic core 3 includes the inner core portion 31 arranged within the coil 2, and the outer core portion 32 arranged around the coil 2. The reactor 1A is featured in including the coil component 2A in which the coil 2 and the inner core portion 31 constituting a part of the magnetic core 3 are integrated with each other by the resin molded portion 20, and in employing a particular material to form the outer core portion 32. Because the coil component 2A is the same as that described above in Embodiment 1, detailed description of the coil component 2A is omitted and other components are described in detail here.

[Layout of Coil Component]

Figure 3:
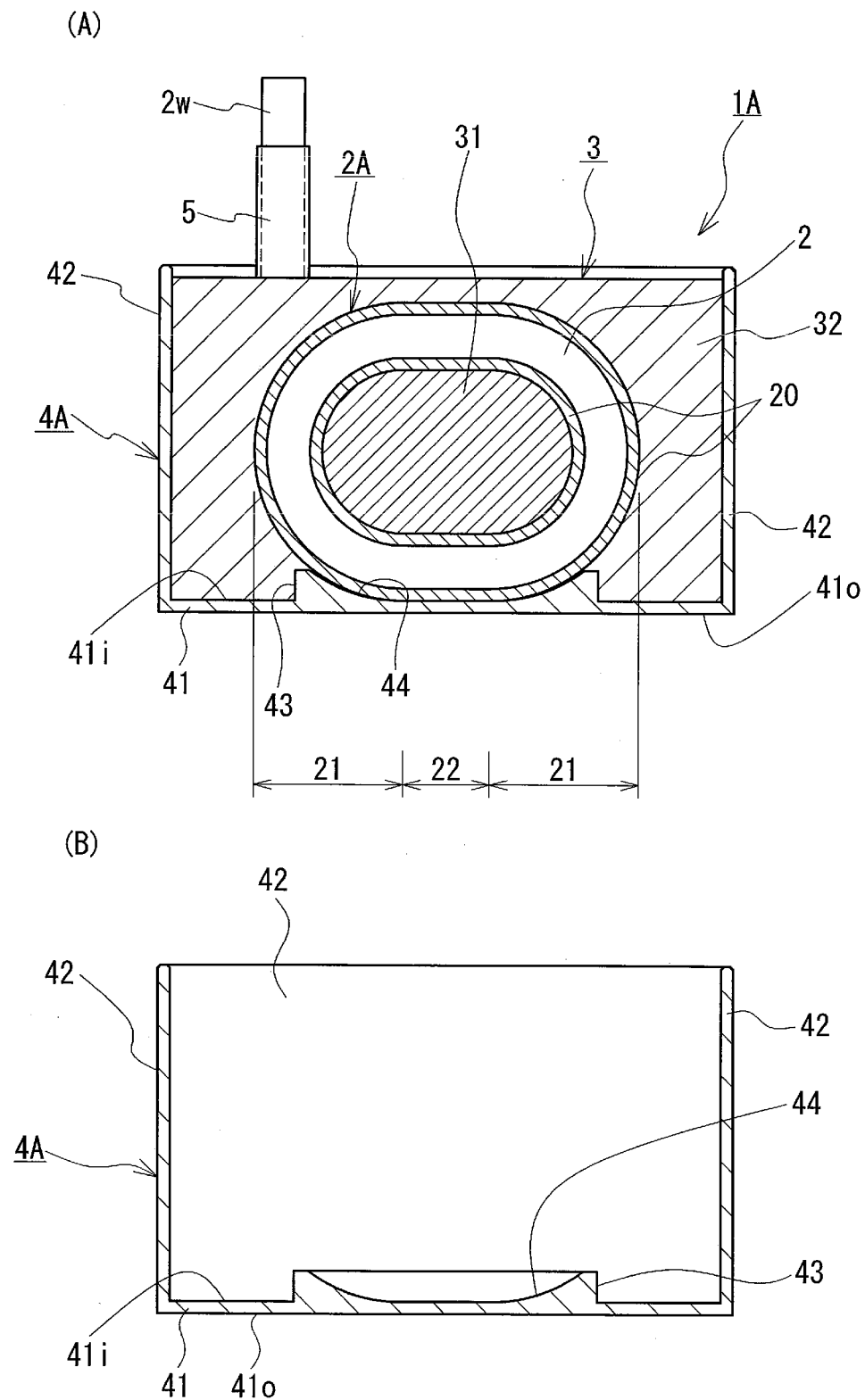
FIG. 3(A) is a sectional view, taken along a line (III)-(III) in FIG. 2, of the reactor according to Embodiment 1.
FIG. 3(B) is a sectional view illustrating only a case that is included in the reactor illustrated in FIG. 3(A).
Figure 4:
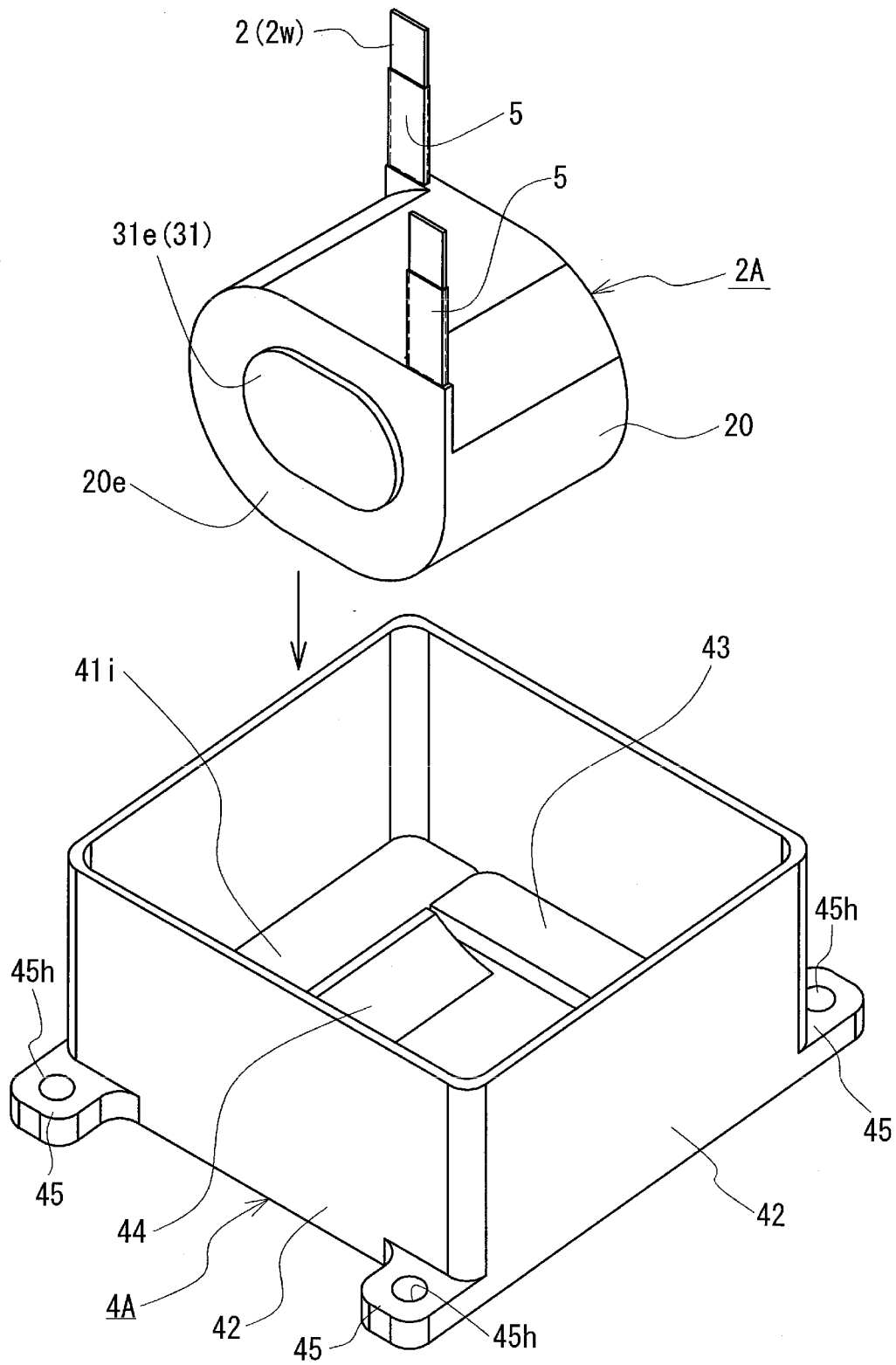
FIG. 4 is a schematic exploded view to explain constituent members of the reactor according to Embodiment I.

As illustrated in FIG. 3, the coil component 2A is housed in the case 4A such that the coil component 2A is contacted with a coil groove 44 formed in a bottom wall 41 of the case 4A and an axis of the coil 2 is positioned parallel to an outer bottom surface 410 of the case 4A. Here, when the reactor 1A is installed on the installation target, the outer bottom surface 410 of the case 4A serves as an installation surface that is contacted with the installation target. The outer bottom surface 410 is formed as a flat surface. In the state where the coil component 2A is housed in the case 4A, therefore, a flat surface region in the outer peripheral surface of the coil component 2A, which region is parallel to the flat surface defined by the linear portion 22 of the coil 2, is parallel to the outer bottom surface 410 of the case 4A. When the reactor 1A is installed on the installation target, the axial direction of the coil 2 is parallel to the surface of the installation target. In short, the coil component 2A is housed in the case 4A such that the coil 2 is arranged to be horizontally long (such a layout is called a horizontal layout hereinafter).

The horizontal layout is advantageous in easily increasing a contact area between the outer peripheral surface of the coil component 2A and an inner bottom surface 41i of the case 4A, and increasing a region where the distance from the outer peripheral surface of the coil component 2A to the inner bottom surface 41i of the case 4A is short, i.e., a region that is positioned close to the installation target. Therefore, the horizontal layout can efficiently transfer heat of the coil 2 to the case 4A such that the heat is transferred to the installation target through the outer bottom surface 410 of the case 4A held in contact with the installation target. Thus, the horizontal layout has a good heat dissipation effect. Furthermore, with the coil component 2A, since the end surface shape of the coil 2 is flattened, it is easier to reduce the height (i.e., the size in the direction perpendicular to the outer bottom surface 410 of the case 4A) and to realize a smaller reactor than the case employing a coil with an end surface shape being a true circle.

In the coil component 2A, a part of the outer peripheral surface defined by the resin of the resin molded portion 20 (here, a region spanning over the flat surface defined by one linear portion 22 of the coil 2 and regions spanning over curved surfaces defined by zones of both the semicircular arc portions 21 connected to the one linear portion 22, the zones being positioned near points connected to the one linear portion 22) is covered with the outer core portion 32 of the magnetic core 3. In short, a C-like shaped region of the outer peripheral surface of the coil component 2A, when perpendicularly looking at the end surface, is covered with the outer core portion 32. Furthermore, a remaining part of the outer peripheral surface of the coil component 2A, which part is not covered with the magnetic core 3, is contacted with the inner bottom surface 41i (coil groove 44 described later) of the case 4A.

In the reactor 1A, portions of the coil component 2A not covered with the resin of the resin molded portion 20 are each covered with an insulating material. More specifically, portions of the coil component 2A contacting with the outer core portion 32, i.e., regions of outer peripheries of the lead-out portions, extending from the turn forming portion, of the wire 2w constituting the coil 2 except for the regions connected to the terminal members, are each covered with an insulating tube 5.

The insulating tube 5 is made of an insulating material that has sufficient heat resistance against a maximum reachable temperature in use of the reactor 1A (e.g., 100° C. or higher and preferably 150° C. or higher in a vehicle-loaded reactor). Any of a heat-shrinkable tube or a room-temperature shrinkable tube can be used. Examples of the heat-shrinkable tube include a heat-shrinkable tube "SUMITUBE K" (base resin: polyvinylidene fluoride (PVDF)) and "SUMITUBE B2" (base resin: polyolefin resin), both made by Sumitomo Electric Fine Polymer, Inc. ("SUMITUBE" is a registered trademark). The room-temperature shrinkable tube can be made of, e.g., silicone rubber (VMQ, FVMQ), butyl rubber (IIR), ethylene propylene rubber (EPM, EPDM), Hypalon (registered trademark, generally called chlorosulfonated polyethylene rubber: CSM), acrylic rubber (ACM, ANM), or fluorine-containing rubber (FKM). Here, "SUMITUBE K" is used.

[Magnetic Core]

Figure 2:
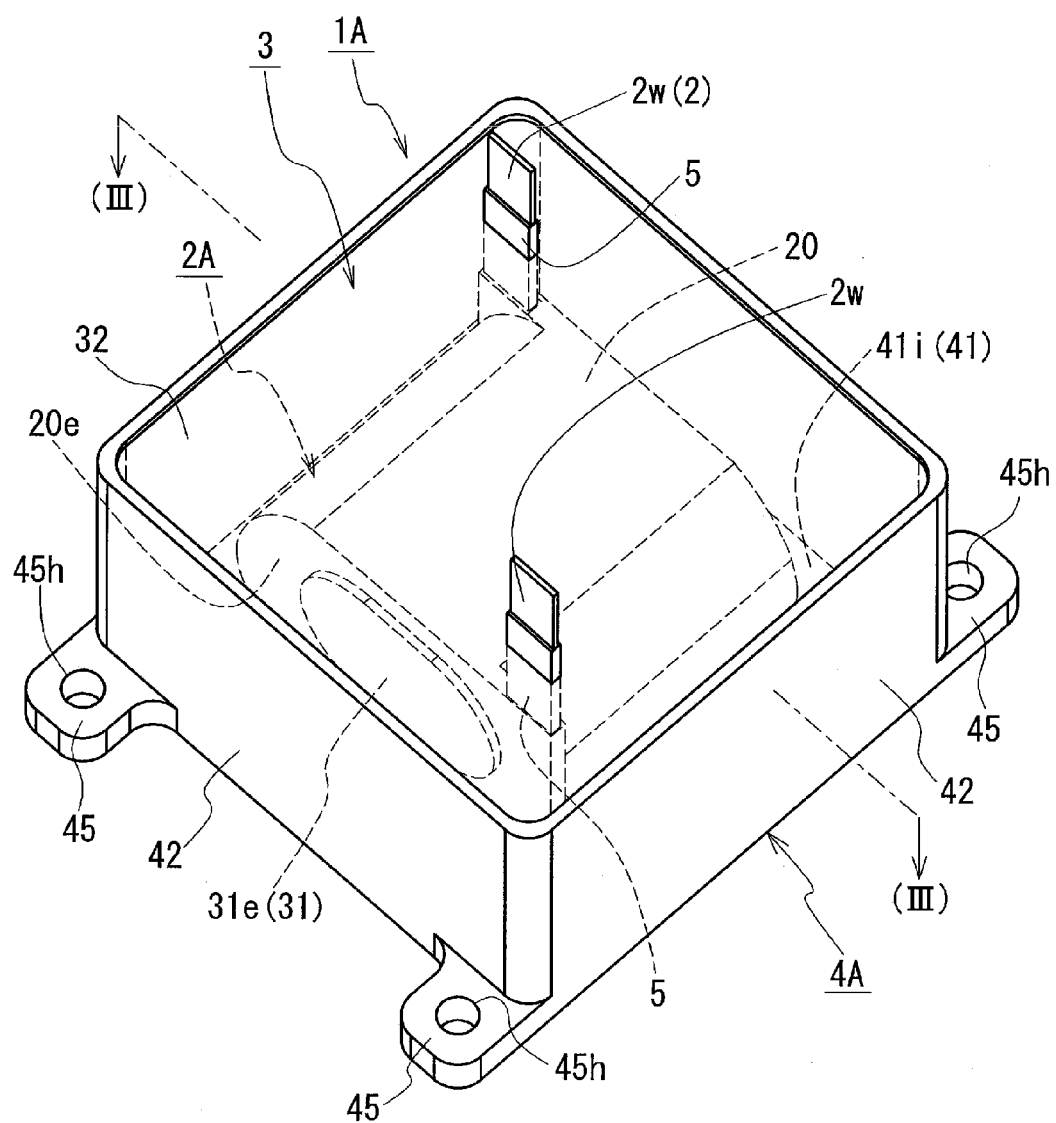
FIG. 2 is a schematic perspective view of a reactor according to Embodiment 1, which includes the coil component according to Embodiment 1.

As illustrated in FIG. 2, the magnetic core 3 includes the inner core portion 31 having a columnar shape and inserted within the coil 2, and the outer core portion 32 formed to cover at least one end surface 31e (here, both end surfaces) of the inner core portion 31 and the part of the outer peripheral surface of the coil component 2A. The magnetic core 3 forms a closed magnetic circuit when the coil 2 is excited. Here, a material constituting the inner core portion 31 and a material constituting the outer core portion 32 are different from each other, and the magnetic core 3 has different magnetic characteristics in the respective portions. More specifically, the inner core portion 31 has a higher saturation magnetic flux density than the outer core portion 32, and the outer core portion 32 has a lower magnetic permeability than the inner core portion 31.

The outer core portion 32 is formed to cover substantially an entire region of the outer peripheral surface of the coil component 2A, which region is not contacted with the case 4A, both the end surfaces 20e of the resin molded portion 20, and both end surfaces 31e of the inner core portion 31 projecting out from the end surfaces 20e and the vicinities thereof. The outer core portion 32 has sectional shapes as follows. In a region of the reactor 1A where the coil 2 is present, when looking at a longitudinal section (i.e., a section cut along a plane extending in the axial direction of the coil 2 and being perpendicular to the outer bottom surface 410 (FIG. 3) of the case 4A) and looking at a transverse section (i.e., a section cut along a plane perpendicular to the axial direction of the coil 2) as illustrated in FIG. 3(A), each of those sections has a C-like shape. Furthermore, when looking at a horizontal section (i.e., a section cut along a plane passing the axis of the coil 2 and being parallel to the outer bottom surface 410 of the case 4A), that section has a rectangular frame shape. Parts of the outer core portion 32 are coupled respectively to both the end surfaces 31*e* of the inner core portion 31, whereby the magnetic core 3 forms a closed magnetic circuit.

Here, the outer core portion 32 is entirely formed of a mixture containing magnetic powder and resin (the mixture being called a molded and hardened body). The inner core portion 31 and the outer core portion 32 are bonded to each other by the resin of the outer core portion 32 without an adhesive interposed therebetween. Here, the outer core portion 32 also has a form including neither a gap member nor an air gap. Accordingly, the magnetic core 3 is a one-piece member that is entirely integrated without including any gap member.

Since the outer core portion 32 covers substantially the entire region of the coil component 2A, which region is not contacted with the case 4A, in a manner of sealing off the coil component 2A within the case 4A, the outer core portion 32 also functions as a sealing member for the coil component 2A. In the reactor 1A, therefore, the outer core portion 32 can protect the coil component 2A from external environments and can enhance mechanical protection.

The outer core portion 32 is just required to form a closed magnetic circuit, and its shape (i.e., a region covering the coil component 2A) is a matter of choice. For example, the outer core portion 32 may have a form not covering a part of the outer periphery of the coil component 2A. In one example of such a form, a region of the outer peripheral surface of the coil component 2A on the opening side of the case 4A is exposed without being covered with the outer core portion. In another form, a region of the case 4A on the bottom surface side is thickened to provide a groove deeper than the coil groove 44 illustrated in FIG. 3, and a larger region of the coil component 2 (e.g., a flat surface region arranged on the bottom surface side of the case 4A and being parallel to the linear portion 22, and curved regions extending along ¼ circular arcs of the semicircular arc portions 21 connected to that linear portion 22) are placed in the deeper groove, thereby increasing the contact area between the coil component 2A and the case 4A. In still another form, a poisoning member (not illustrated) for the coil component 2A is separately disposed on the inner bottom surface 41*i* of the case 4A, and a portion of the coil component 2A contacting with the positioning member is not covered with the outer core portion. Heat dissipation can be enhanced by using a material having a good heat dissipation effect to form the positioning member.

The molded and hardened body can be typically formed by injection molding or cast molding. The injection molding is performed by mixing powder made of a magnetic material and resin in a fluidal state with each other, pouring the mixed fluid into a mold (here, the case 4A) for molding usually under a predetermined pressure, and then hardening the resin. The cast molding is performed by preparing a mixed fluid similar to that used in the injection molding, pouring the mixed fluid into a mold for molding without application of pressure, and then hardening the resin.

The magnetic powder used in any of the molding methods may be powder similar to the soft magnetic powder used for the inner core portion 31 described above. In particular, the powder made of the iron-based material, e.g., the pure iron powder or the Fe-based alloy powder, can be preferably used as the soft magnetic power for the outer core portion 32. Plural types of magnetic powders made of different materials may also be used by mixing them. The eddy current loss can be reduced by employing the coated powder in which an insulating coating made of, e.g., phosphate, is formed on the surface of a magnetic particle made of the soft magnetic material (particularly the metal material). A mean particle diameter of the magnetic powder is preferably 1 μm or more and 1000 μm or less and more preferably 10 μm or more and 500 μm or less for convenience in use. It becomes easier to obtain a reactor having a higher saturation magnetic flux density and a smaller loss by employing plural types of powders having different particle diameters.

In any of the above-described molding methods, a thermosetting resin, such as an epoxy resin, a phenol resin, a silicone resin, or a urethane resin, can be preferably used as the resin serving as a binder. When the thermosetting resin is used, the resin is thermally hardened by heating a molded body. A room-temperature setting resin or a cold setting resin may be used as the resin serving as a binder. In that case, the resin is hardened by leaving a molded body to stand in a state of from a room temperature to a comparatively low temperature. Because the resin, which is a nonmagnetic material, remains in a comparatively large amount within the molded and hardened body, a core having a lower saturation magnetic flux density and a lower magnetic permeability can be more easily formed using the molded and hardened body in comparison with the case using the powder compact even when the same soft magnetic powder as that used for the powder compact constituting the inner core portion 31 is used.

In addition to the magnetic powder and the resin serving as a binder, filler made of ceramic, e.g., alumina or silica, may be further mixed into the materials of the molded and hardened body. By mixing the filler having a smaller specific gravity than the magnetic powder, it is possible to suppress localized presence of the magnetic powder, and to more easily obtain the molded and hardened body over the entirety of which the magnetic powder is uniformly dispersed. Furthermore, when the filler is made of a material having good thermal conductivity, the filler contributes to improving the heat dissipation effect. When the filler is mixed, the content of the filler is, for example, 0.3% or more by mass and 30% or less by mass with respect to 100% by mass of the molded and hardened body. The total content of the magnetic powder and the filler is, for example, 20% by volume to 70% by volume with respect to 100% by volume of the molded and hardened body. Moreover, using the filler in a finer particle than the magnetic powder is advantageous in that the filler is interposed between the magnetic particles in a way capable of effectively preventing localized presence of the magnetic powder and uniformly dispersing the magnetic powder, and that a reduction of a proportion of the magnetic powder due to addition of the filler can be suppressed with ease.

Here, the outer core portion 32 is formed of the molded and hardened body containing the coated powder, which has the insulating coating on the surface of a magnetic particle made of the iron-based material and having a mean particle diameter of 100 μm or less, and an epoxy resin.

The inner core portion 31 is formed of the compact powder as described above, and it has the saturation magnetic flux density of 1.6 T or more and 1.2 or more times that of the outer core portion 32, and the relative magnetic permeability of 100 to 500. The outer core portion 32 has the saturation magnetic flux density of 0.5 T or more and less than that of the inner core portion 31, and the relative magnetic permeability of 5 to 30. The relative magnetic permeability of the entire magnetic core 3, made up of the inner core portion 31 and the outer core portion 32, is 10 to 100. When a certain amount of magnetic flux is to be obtained, a sectional area of the inner core portion can be further reduced as an absolute value of the saturation magnetic flux density of the inner core portion is higher and as the saturation magnetic flux density of the inner core portion is higher to a larger extent than that of the outer core portion. Therefore, a form in which the inner core portion has a higher saturation magnetic flux density can contribute to reducing the size of the reactor. The saturation magnetic flux density of the inner core portion 31 is preferably 1.8 T or more and more preferably 2 T or more, and it is preferably 1.5 or more times and more preferably 1.8 or more times the saturation magnetic flux density of the outer core portion 32. In any case, an upper limit is not specified. The saturation magnetic flux density of the inner core portion can be more easily increased by employing a stack of electric steel sheets, which are typically represented by silicon steel sheets, instead of the power compact. Alternatively, the inner core portion 31 may also be formed of the molded and hardened body, and the saturation magnetic flux density of the inner core portion may be increased by employing magnetic powder made of a material different from that of the magnetic powder constituting the outer core portion 32, or by adjusting a mixing ratio of the resin that is mixed into the molded and hardened body. In that case, the molded and hardened body for the inner core portion is preferably separately fabricated such that it can be integrated with the coil by the resin molded portion. By setting the magnetic permeability of the outer core portion 32 to be lower than that of the inner core portion 31, it is possible to reduce leakage flux of the magnetic core 3, and to constitute the magnetic core 3 of a gapless structure. The magnetic permeability and the saturation magnetic flux density of the molded and hardened body can be adjusted by changing a mixing ratio of the magnetic powder and the resin serving as a binder. For example, the molded and hardened body having a lower magnetic permeability is obtained by reducing an amount of the magnetic powder mixed. The saturation magnetic flux density and the relative magnetic permeability of each of the core portions 31 and 32 can be measured by preparing a specimen obtained from each of the core portions 31 and 32, and by employing, e.g., a commercially-available B-H curve tracer or a Vibrating Sample Magnetometer (VSM).

When the coil component 2A is arranged in the horizontal layout as in the reactor 1A and the coil component 2A is housed in the case 4A in a state positioned close to the inner bottom surface 41i of the case 4A, the magnetic powder may precipitate onto the bottom wall 41 of the case 4A during the production of the molded and hardened body, thus resulting in the molded and hardened body (outer core portion) in which the magnetic powder is localized on the side near the boom wall 41. Even in that case, however, because the coil 2 and the inner core portion 31 are positioned close to the bottom wall 41 of the case 4A and the molded and hardened body tends to come into such a state that a region of the molded and hardened body constituting the outer core portion where the magnetic powder is present at a higher density is contacted with the inner core portion 31, a closed magnetic circuit can be sufficiently formed. The localized presence of the magnetic powder may be suppressed by employing the molded and hardened body that contains the above-mentioned filler.

[Case]

The case 4A is typically a rectangular parallelepiped box-like member constituted by a rectangular bottom wall 41 and four sidewalls 42 vertically extending from the bottom wall 41 with a surface opposed to the bottom wall 41 being open. The case 4A is typically utilized as not only a container for housing the assembly of the coil 2 and the magnetic core 3 (assembly of the coil component 2A and the outer core portion 32), but also as a heat dissipation path. Accordingly, the case 4A is suitably made of a material having good thermal conductivity, preferably a material, e.g., a metal such as aluminum, an aluminum alloy, magnesium, or a magnesium alloy, having a higher thermal conductivity than the magnetic power made of iron, for example. Because aluminum, magnesium, and alloys of the formers are light-weight, they are suitable as materials of automobile parts for which weight lightening is demanded. In addition, because aluminum, magnesium, and alloys of the formers are nonmagnetic materials and conductive materials, leakage flux to the outside of the case 4A can also be effectively prevented. Here, the case 4A is made of an aluminum alloy.

While an outer peripheral shape and an inner peripheral shape of the case 4A are typically analogous to each other, they are non-analogous in the case 4A used here. In more detail, as illustrated in FIG. 3(B), the bottom wall 41 of the case 4A is formed such that the outer bottom surface 41o, which serves as the installation surface when the reactor 1A is installed on the installation target such as a water cooling base, is constituted as a flat surface, and that the inner bottom surface 41i contacting with the part of the outer peripheral surface of the coil component 2A has an uneven shape with a thickness varying in parts. The inner bottom surface 41i includes a pedestal 43 formed in its central portion and extending from one sidewall 42 to the other sidewall 42 opposed to the former, and the bottom wall 41 is thickened in its portion corresponding to the pedestal 43. The pedestal 43 is formed integrally with the inner bottom surface 41i, and the coil groove 44 is formed in a part of the pedestal 43 for fitting with the part of the outer peripheral surface of the coil component 2A.

As illustrated in FIG. 3, the coil groove 44 has a shape following the outer peripheral surface of the coil component 2A, and it is made up of a flat surface portion that is contacted with the flat surface region of the coil component 2A extending along the flat surface defined by the linear portion 22, and curved portions that are contacted with the curved surface regions of the coil component 2A extending along the curved surfaces defined by the semicircular arc portions 21. A region of the pedestal 43 constituting the flat portion thereof has a minimum thickness that is comparable to the thickness of the bottom wall 41 in its region where the pedestal 43 is not present. By thus thickening only a part of the bottom wall 41, it is possible to ensure a sufficient volume of the outer core portion 32 and to suppress an increase in weight of the case 4A. Moreover, since the coil groove 44 has the shape following the outer peripheral surface of the coil component 2A, the coil groove 44 can also function as a member for positioning the coil component 2A relative to the case 4A.

In an alternate form, the inner bottom surface 41i may be formed as a flat surface with omission of the coil groove 44. Even in that case, since the coil component 2A has the flat surface region following the flat surface defined by the linear portion 22, the flat surface region of the outer peripheral surface of the coil component 2A can be held in contact with the flat inner bottom surface of the case, whereby the heat dissipation effect can be improved. When the coil groove 44 is not formed, a positioning member may be separately disposed for easier positioning of the coil component 2A within the case 4A. The positioning member is preferably formed, for example, as a molded and hardened body made of a material similar to that of the outer core portion 32. The reason is that such a molded and hardened body can be easily integrated with the outer core portion 32 when the outer core portion 32 is formed, and that the separate positioning member can be utilized as a magnetic circuit. Alternatively, heat dissipation can be enhanced by employing a material having a good heat dissipation effect to form the positioning member.

In addition, the case 4A illustrated in FIG. 2 includes mounting portions 45 having bolt holes 45h to fix the reactor 1A to the installation target using fixing members, e.g., bolts. With the provision of the mounting portions 45, the reactor 1A can be easily fixed to the installation target using fixing members, e.g., bolts. The case 4A including the pedestal 43, the coil groove 44, and the mounting portions 45 as described above and having a complicated three-dimensional shape can be easily manufactured by casting or cutting, for example. Furthermore, when the outer bottom surface 410 is constituted by substantially only a flat surface as in this embodiment, a sufficiently large contact area between the outer bottom surface 410 and the installation target can be ensured and good productivity is obtained for the case 4A. However, the outer bottom surface may have an uneven portion for the purpose of, e.g., increasing a surface area of the case 4A.

While the case 4A may be used in an open state, it is preferably used in a form including a cover that is made of a conductive material, e.g., aluminum, like the case 4A from the viewpoint of preventing the leakage flux and protecting the outer core portion 32 from environments and mechanical damages. Cutouts or through-holes are formed in the cover such that the end portions of the wire 2w of the coil 2 included in the coil component 2A can be led out through the cover.

Since the coil 2 is contacted with the case 4A, which is made of the metal material, while the resin of the resin molded portion 20 is interposed therebetween, insulation between the coil 2 and the case 4A can be ensured with that resin. In an alternative form, only a portion of the coil 2, which is directly contacted with the coil groove 44 of the case 4A, is exposed from the resin molded portion 20 such that the coil 2 is partly brought into direct contact with the case 4A, from the viewpoint of enhancing the heat dissipation. In such a form, the insulation between the coil 2 and the case 4A can be enhanced by interposing an insulating member, e.g., insulating paper, an insulating sheet, or an insulating tape, between them. Such an insulating member is required to have a thickness just enough to ensure the insulation at a minimum level necessary between the coil 2 and the case 4A. By minimizing the thickness of the insulating member, it is possible to suppress a reduction of thermal conductivity caused by the presence of the insulating member, and to reduce the size. The insulating member used here preferably has a high thermal conductivity. Alternatively, an insulating adhesive may be used as that insulating member. In that case, the insulating adhesive can not only enhance the insulation between the coil 2 and the case 4A, but also reliably fix the coil component 2A to the case 4A with the function as an adhesive. The insulating adhesive is preferably made of an adhesive that contains filler particularly having good thermal conductivity, e.g., filler made of alumina having good thermal conductivity and good electrical insulation. By forming a layer of the insulating adhesive in a smaller thickness and in a multilayer structure, electrical insulation can be enhanced even with a smaller total thickness of the insulating adhesive.

[Intended Use]

The reactor 1A having the above-described structure can be suitably used under energization conditions with, e.g., a maximum current (direct current) of about 100 A to 1000 A, an average voltage of about 100 V to 1000 V, and working frequency of 5 kHz to 100 kHz, typically as a component of a vehicle-loaded power conversion device for an electric car or a hybrid car. In such use, the reactor 1A is expected to be suitably used with satisfaction of the conditions that an inductance is 10 μH or more and 2 mH or less when the supplied direct current is 0 A, and that an inductance during supply of a maximum current is 10% or more of the inductance obtained at 0 A.

[Size of Reactor]

When the reactor 1A is used as a vehicle-loaded component, the capacity of the reactor 1A, including the case 4A, is preferably about 0.2 liter (200 cm$^3$) to 0.8 liter (800 cm$^3$). In this embodiment, the capacity is about 500 cm$^3$.

[Method of Manufacturing Reactor]

The reactor 1A including the coil component 2A can be manufactured, by way of example, as follows. First, the coil component 2A is fabricated as described above. Here, as illustrated in FIG. 4, the coil component 2A including the insulating tubes 5, which have been fitted over the lead-out portions of the wire 2w in advance, is prepared. That coil component 2A is placed into the case 4A as illustrated in FIG. 4. By fitting the coil component 2A to the coil groove 44, the coil component 2A can be properly positioned inside the case 4A with ease. The mixed fluid of the magnetic powder and the resin, the mixed fluid constituting the outer core portion 32 (FIG. 2), is poured into the case 4A as appropriate for molding into a predetermined shape, and the resin is then hardened. Through the above-mentioned steps, the outer core portion 32 can be formed and the reactor 1A (FIG. 2) can be obtained simultaneously.

Advantageous Effects

Since the reactor 1A includes the coil component 2A that is easier in handling, good assembly workability is obtained. For example, the coil 2 and the inner core portion 31 can be simultaneously placed into the case 4A without being separated from each other, thus facilitating the step of placing them into the case 4A. With the reactor 1A, since the outer core portion 32 is made of the mixture of the magnetic powder and the resin, the outer core portion 32 having a complicated shape to cover the part of the outer peripheral surface of the coil component 2A can be easily formed. With the reactor 1A, at the same time as when the outer core portion 32 is formed, the inner core portion 31 and the outer core portion 32 are bonded to each other by the resin of the outer core portion 32 so as to form the magnetic core 3, whereby the reactor 1A is manufactured. Thus, the number of manufacturing steps is reduced. Moreover, since the reactor 1A has the gapless structure, a step of bonding a gap member is not needed. Those points also contribute to improving the assembly workability of the reactor 1A.

Since the above-mentioned mixture is used to form the outer core portion 32, the following advantageous effects can be obtained. (1) Magnetic characteristics of the outer core portion 32 can be easily changed. (2) With the outer core portion 32 containing the resin component, the coil component 2A (i.e., the coil 2 and the inner core portion 31) can be protected from external environments and mechanical damages even when the case 4A is open.

In the reactor 1A, since the surface of the coil 2 is covered with the resin of the resin molded portion 20, the coil 2 is contacted with the case 4A with that resin interposed therebetween. Thus, since an insulator is present between the coil 2 and the case 4A, insulation between the coil 2 and the case 4A made of metal can be effectively enhanced. Accordingly, the reactor 1A can sufficiently ensure the insulation even when a large current is supplied to the coil 2. With the reactor 1A, since the insulating tubes 5 are fitted over the outer peripheries of portions of the wire 2w constituting the coil 2 of the coil component 2A, which portions are contacted with the outer core portion 32, insulation between the coil 2 (wire 2w) and the magnetic core 3 can also be effectively enhanced by the resin of the resin molded portion 20 and the insulating tubes 5. Furthermore, by employing the insulating tubes 5, the size of the coil component 2A can be easily reduced in comparison with the case where the above-mentioned contact portions of the wire 2w are covered with the resin of the resin molded portion. As a result, the size of the coil component 2A can be reduced and the reactor 1A having a smaller size can be obtained.

In the reactor 1A, although the resin of the resin molded portion 20 is present between the coil 2 and the case 4A, the contact area of the coil component 2A with respect to the case 4A includes the flat surface, and hence the contact area with respect to the case 4A can be easily increased. Because of the horizontal layout, there is a large region where the distance from the outer periphery of the coil 2 to the case 4A is short. Therefore, the reactor 1A has a good heat dissipation effect. Furthermore, since the contact area of the coil component 2A with respect to the case 4A includes the flat surface, the coil component 2A is stably supported on the inner bottom surface 41i of the case 4A, and such a supported state is positively maintained as a result of sealing-off by the outer core portion 32. Accordingly, the reactor 1A can sustain a good heat dissipation effect for a long term. Moreover, in the reactor 1A, the coil groove 44 having the shape following the outer peripheral surface of the coil component 2A is formed in the inner bottom surface 41i of the case 4A, and not only the flat surface region extending along the linear portion 22, but also parts of the curved regions extending along the curves surfaces defined by the semicircular arc portions 21 are held in contact with the inner bottom surface 41i. Hence the reactor 1A has a larger contract area between the coil component 2A and the case 4A than when the inner bottom surface of the case is formed only by a flat surface, thus resulting in a higher heat dissipation effect.

Since the reactor 1A includes one coil 2 and has the horizontal layout where the coil component 2A is housed in the case 4A such that the axial direction of the coil 2 is parallel to the outer bottom surface 410 of the case 4A, the reactor 1A has a lower height and a smaller size. In particular, with the reactor 1A, since each of the end surfaces of the coil 2 has the race track shape, the coil 2 can be formed by edgewise winding using a coated rectangular wire as the wire 2w, thus providing a coil with a higher space factor and a smaller size. That point also contributes to reducing the size of the reactor 1A. Moreover, with the reactor 1A, the case 4A can be utilized as a heat dissipation path, and the case 4A can protect the coil component 2A and the outer core portion 32 from external environments, such as dust and corrosion, and from mechanical damages.

With the reactor 1A, since the inner core portion 31 has a higher saturation magnetic flux density than the outer core portion 32, a sectional area of the inner core portion 31 (i.e., a surface thereof through which magnetic flux passes) can be reduced when the same magnetic flux is to be obtained with a magnetic core that is made of a single material and that has a uniform saturation magnetic flux density over the entire magnetic core. That point further contributes to reducing the reactor size. With the reactor 1A, since the inner core portion 31 over which the coil 2 is arranged has a higher saturation magnetic flux density and the outer core portion 32 arranged around the coil 2 has a lower magnetic permeability, magnetic saturation can be inhibited even with omission of a gap. That point still further contributes to reducing the reactor size. With the reactor 1A, since a gap for adjusting inductance is not present over the entire magnetic core 3, leakage flux through the gap does not affect the coil 2, thus providing a coil component in which the outer peripheral surface of the inner core portion 31 and the inner peripheral surface of the coil 2 are positioned closer to each other. In that case, a clearance between the outer peripheral surface of the inner core portion 31 and the inner peripheral surface of the coil 2 can be reduced, whereby the size of the reactor 1A can be further reduced. In particular, with the reactor 1A, since the inner core portion 31 has the outer shape analogously following the inner peripheral surface of the coil 2, the above-mentioned clearance can be further reduced. Moreover, the loss can be reduced with the omission of the gap. In addition, with the reactor 1A, since the outer periphery of the coil 2 is covered with the molded and hardened body that contains the magnetic powder, the heat dissipation effect are improved in comparison with the case where the coil is covered with only resin.

Embodiment 2

Figure 5:
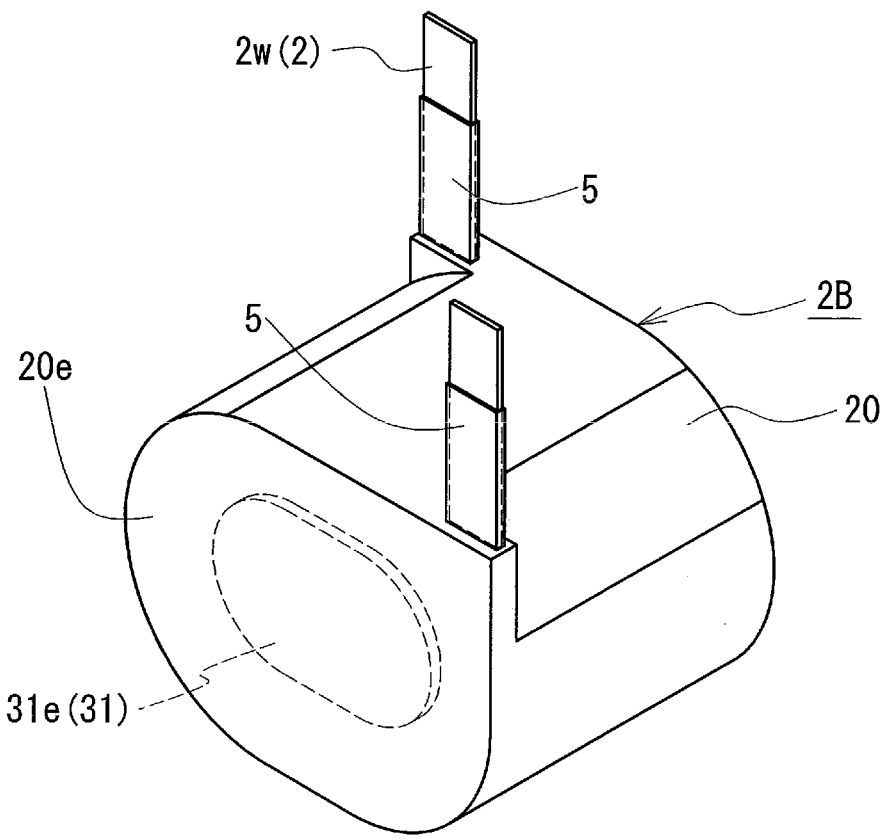
FIG. 5 is a schematic perspective view of a coil component according to Embodiment 2.

A coil component 2B of Embodiment 2 will be described below with reference to FIG. 5. Embodiment 1 has been described in connection with the form in which both the end surfaces 31e of the inner core portion 31 are exposed from the resin molded portion 20. The coil component 2B of Embodiment 2 differs from the coil component 2A of Embodiment 1 in that at least one end surface 31e of the inner core portion 31 is covered with the resin molded portion 20. The following description is made mainly about such a different point and advantageous effects based on the difference point, whereas description of construction and advantageous effects common to those in Embodiment 1 is omitted.

The coil component 2B includes the resin molded portion 20 covering the outer peripheral surface and both the end surfaces 31e of the inner core portion 31, which has a columnar shape and which is inserted within the cylindrical coil 2. The end surfaces 20e of the coil component 2B are formed as flat surfaces by the resin of the resin molded portion 20.

A thickness and a coverage region of the resin of the resin molded portion 20 covering each end surface 31e of the inner core portion 31 can be optionally selected. By using a resin of a nonmagnetic material as the resin of the resin molded portion 20, the resin covering the end surface 31e of the inner core portion 31 can be given with the function as a gap member. The thickness and the coverage region of the resin of the resin molded portion 20 covering the end surface 31e of the inner core portion 31 are preferably selected such that a reactor including the coil component 2B has the desired inductance. With the coil component 2B of Embodiment 2, since the resin of the resin molded portion 20 can also be utilized as an inductance adjusting parameter in addition to the specifications of the coil 2 and the specifications of the magnetic core including the inner core portion 31, a degree of freedom in selecting the coil and the magnetic core can be increased. While both the end surfaces 31e of the inner core portion 31 are entirely covered here, any one of both the end surface 31e may be exposed from the resin molded portion 20, or a part of at least one end surface 31e may be exposed from the resin molded portion 20.

While, in the coil component 2B, parts of the lead-out portions of the wire 2w constituting the coil 2, which parts are exposed from the resin of the resin molded portion 20, are covered with the insulating tubes 5 as in the coil component 2A including the reactor 1A of Embodiment 1, those parts may be exposed in a modified form as described in Embodiment 1. The matters regarding the insulating tube 5 are similarly applied to Embodiment 3 described later.

Embodiment 3

Figure 6:
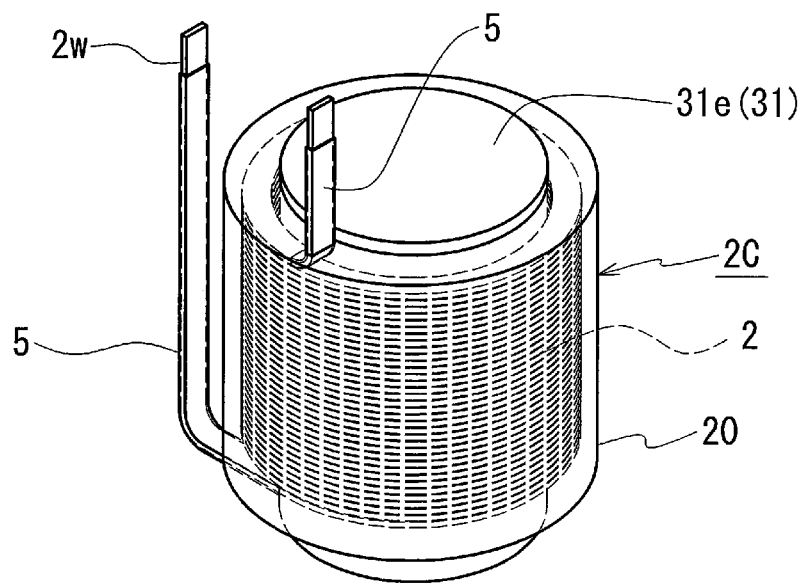
FIG. 6 is a schematic perspective view of a coil component according to Embodiment 3.

A coil component 2C of Embodiment 3 will be described below with reference to FIG. 6. Embodiment 1 has been described in connection with the case where the end surface of the coil has the race track shape. In the coil component 2C of Embodiment 3, the end surface of the coil 2 has a circular shape, and the resin molded portion 20 is formed following such an outer shape of the coil 2. Furthermore, the coil component 2C of Embodiment 3 is arranged in such a layout that the axial direction of the coil 2 is a vertical direction. The following description is made mainly about those different points (i.e., the end surface shape and the layout of the coil) and advantageous effects based on the difference points, whereas description of construction and advantageous effects common to those in Embodiment 1 is omitted.

In the coil component 2C, the cylindrical coil 2 and the columnar inner core portion 31, which has the outer peripheral surface following the inner peripheral surface of the coil 2, are held integrally with each other by the resin molded portion 20. Both the end surfaces 31e of the inner core portion 31 and the vicinities thereof project from the end surfaces of the coil 2, and they are exposed without being covered with the resin molded portion 20. Furthermore, in the coil component 2C, one end surface (lower end surface in FIG. 6) of the inner core portion 31, projecting from the coil 2, serves as a surface on the installation side. While, in the coil component 2C of Embodiment 3, both the end surfaces 31e of the inner core portion 31 are exposed from the resin molded portion 20, that form may be modified such that at least one end surface 31e and the vicinity thereof are covered with the resin of the resin molded portion 20 as in the coil component 2B of Embodiment 2.

With the coil component 2C, since the coil 2 has a cylindrical shape, an edgewise coil can be easily formed even when a rectangular wire is used as the wire 2w. That point contributes to improving the productivity. Moreover, since the at least one end surface of the inner core portion 31 projects from the coil end surface, the coil component 2C can be stably mounted in, e.g., a case by utilizing the projected end surface as a surface on the mounting side. Since the inner core portion 31 is formed of a power compact having a higher saturation magnetic flux density than the molded and hardened body and the end surfaces 31e and the vicinities thereof sufficiently project from the coil 2, the loss can be reduced. In addition, with the coil component 2C, since the coil 2 has a cylindrical shape, it has a shorter circumferential length than, e.g., the coil having the race track shape, and an amount of the wire 2w used to form the coil can be reduced. It is hence possible to reduce the copper loss and the weight.

Embodiment II

Figure 7:
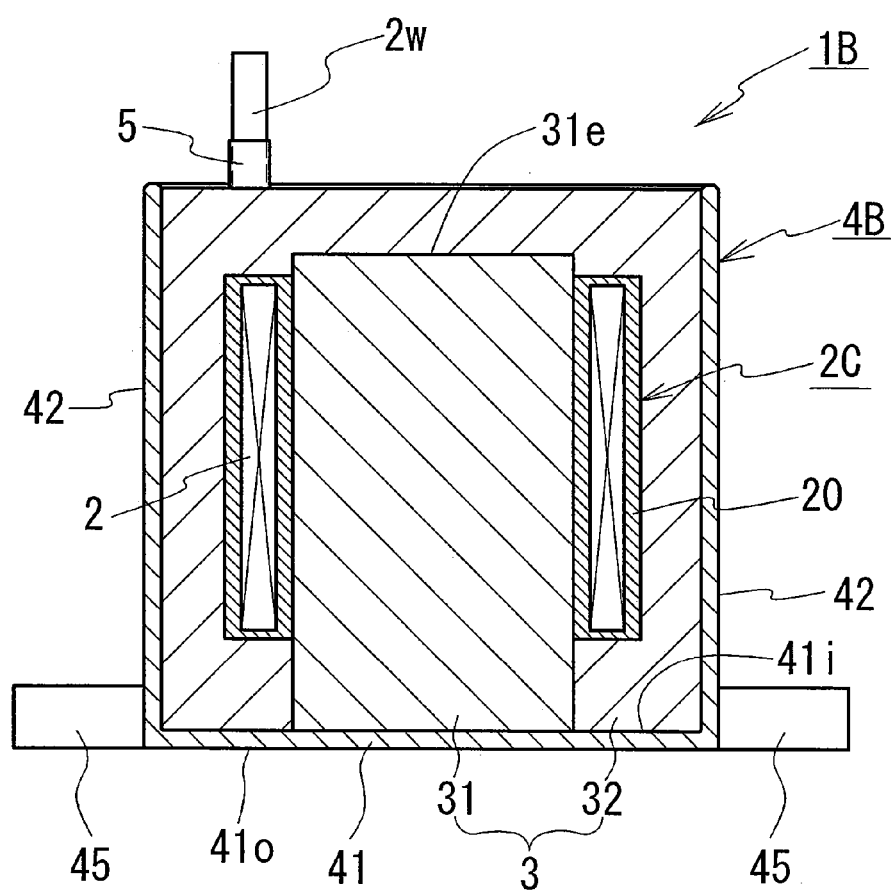
FIG. 7 is a sectional view of a reactor according to Embodiment II, which includes the coil component according to Embodiment 3.

A reactor 1B of Embodiment II will be described below with reference to FIG. 7. A basic construction of the reactor 1B is similar to that of the reactor 1A of Embodiment I, and it includes the coil 2, the magnetic core 3, and a case 4B for housing both the coil 2 and the magnetic core 3. The reactor 1B differs from the reactor 1A in including the coil component 2C of Embodiment 3 and in layout of the coil component 2C. The following description is made mainly about those different points and advantageous effects based on the difference points, whereas description of construction and advantageous effects common to those in Embodiment 1 is omitted.

An outer peripheral shape and an inner peripheral shape of the case 4B are analogous to each other. The case 4B further has a bottom wall 41 having a flat surface, and a sidewall 42 vertically extending from the bottom wall 41. The coil component 2C is housed in the case 4B such that the axis of the coil 2 is positioned perpendicularly to the bottom wall 41 (outer bottom surface 41o) of the case 4B (such a layout is called a vertical layout hereinafter). In the coil component 2C, one end surface of the inner core portion 31, which end surface is exposed from the resin molded portion 20, is contacted with an inner bottom surface 41i of the case 4B. Furthermore, the outer core portion 32 is disposed so as to cover the outer peripheral surface of the coil component 2C housed in the case 4B, a region near one end surface (lower end surface in FIG. 7) of the inner core portion 31, which region is exposed from the resin molded portion 20, and the other end surface 31e (upper end surface in FIG. 7) of the inner core portion 31 and a region thereof near the other end surface 31e. The inner core portion 31 is formed of a powder compact, and the outer core portion 32 is formed of a molded and hardened body using a mixture that contains magnetic powder and resin.

The reactor 1B also has good assembly workability because of employing the coil component 2C. Since the outer core portion 32 is formed of the molded and hardened body, the outer core portion 32 having a complicated shape can be easily molded. Furthermore, with the reactor 1B, the coil 2 can be easily formed because of having a cylindrical shape. In addition, with the reactor 1B, in spite of the coil component 2B having a cylindrical shape, the coil component 2B has good stability with respect to the case 4B because the end surface of the inner core portion 31 serves a surface contacting with the case 4B. Thus, there is hardly a possibility that the coil component 2B may be fallen down, for example, when the material of the outer core portion 32 is filled into the case 4B. Those points contribute to improving productivity of the reactor 1B. Moreover, since the reactor 1B is arranged in the vertical layout, a contact area of the coil component 2B with respect to the case 4B is small and an area necessary for installation to the installation target can be reduced.

The assembly workability can be further improved by providing projections on an inner peripheral surface of the sidewall 42 of the case 4B and/or the inner bottom surface 41i thereof as appropriate, and by utilizing those projections as members for positioning the coil component 2C relative to the case 4B. Alternatively, a positioning member formed using the material of the outer core portion 32 may be separately disposed as described above.

The reactor 1B including the coil component 2C may be arranged in the horizontal layout as in the reactor 1A of Embodiment I. In that case, the coil component 2C can be satisfactorily positioned relative to the case by forming a coil groove in the bottom wall 41 of the case 4B in a shape following the outer shape of the coil component 2C as in the case 4A of the reactor 1A. Moreover, by forming the coil groove, a region where the distance of a heat dissipation path up to the case is short can be increased in the coil 2 included in the coil component 2C as in the reactor 1A. Therefore, a reactor having a good heat dissipation effect can be obtained.

Embodiment 4

The coil components 2A and 2B of Embodiments 1 and 2 have been described in connection with the case where the end surface of the coil 2 has the race track shape. Embodiment 3 has been described in connection with the case where the end surface of the coil has the circular shape. In addition, the end surface shape of the coil may be (1) an elliptic shape, (2) a special shape in which a part of a curved line in a horizontally-long ellipse is replaced with a linear line parallel to the major axis of the ellipse, thus including one linear portion, and (3) a rectangular shape having rounded corners.

In the coil having the elliptic shape in above (1), it is particularly preferable that the coil component has a horizontally-long elliptic shape with a large aspect ratio (major axis/minor axis) and includes the resin molded portion formed following an outer shape of the horizontally-long elliptic coil. In that coil component, a region close to the inner bottom surface of the case (and hence to the installation target) is increased, whereby the heat dissipation effect is improved. Moreover, since the horizontally-long coil has a lower height and a smaller size, the size of the coil component can be reduced and the size of the reactor can also be reduced. Fabrication of that coil having a shape defined by only a curved line is facilitated, for example, by employing a round wire of which conductor has a circular cross-sectional shape. On condition that an area inside the coil is held constant, the elliptic coil has a shorter circumferential length than the coil of Embodiment 1, which has the race track shape. It is hence possible to reduce the amount of the wire used to form the coil, the loss such as copper loss, and the weight.

Each of the coil having the special shape in above (2) and the coil having the corner-rounded rectangular shape in above (3) has a linear portion similarly to the coil of Embodiment 1 having the race track shape. Thus, by fabricating the coil component which includes the resin molded portion formed following an outer shape of the coil, a surface of the coil component, which is contacted with the case, can be formed as a flat surface. Accordingly, even when the inner bottom surface of the case is a flat surface, that type of coil component can not only sufficiently provide an contact area with respect to the inner bottom surface of the case, but also exhibit good stability with respect to the case. Fabrication of the coil having the special case is also facilitated by using the round wire. On the other hand, the coil having the corner-rounded rectangular shape can be formed as an edgewise coil using a rectangular wire similarly to the coil of Embodiment 1 having the race track shape. As a result, a space factor can be increased and the coil size can be reduced.

Any of the coils in above (1) to (3) may be arranged in the horizontal layout as in the reactor 1A of Embodiment I, or in the vertical layout as in the reactor 1B of Embodiment II.

Embodiment i

The reactors 1A and 1B of Embodiments I and II and the reactors including the coil components of Embodiments 2 and 4, etc., can be each utilized, for example, as a component of a converter loaded on a vehicle, etc., or a component of a power conversion device including the converter.

Figure 8:
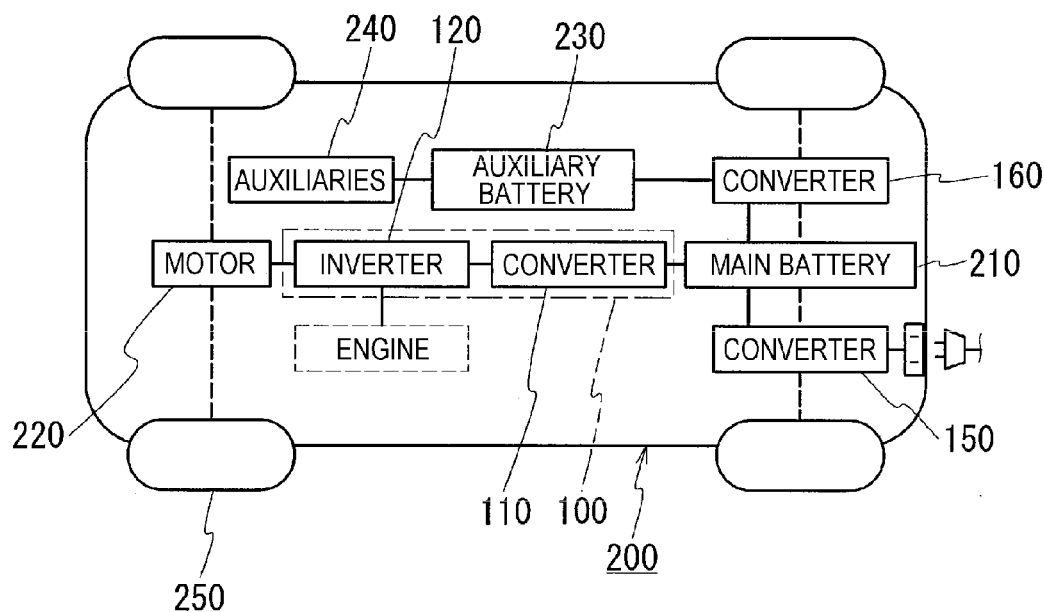
FIG. 8 is a block diagram schematically illustrating a power supply system of a hybrid car.

As illustrated in FIG. 8, for example, a vehicle 200, e.g., a hybrid car or an electric car, includes a main battery 210, a power conversion device 100 connected to the main battery 210, and a motor (load) 220 that is driven with electric power supplied from the main battery 210 to run the vehicle 200. The motor 220 is typically a 3-phase alternating current (AC) motor, which drives wheels 250 during running and which functions as a generator during regeneration. In the case of a hybrid car, the vehicle 200 includes an engine in addition to the motor 220. While FIG. 8 illustrates an inlet as a charging port of the vehicle 200, the vehicle 200 may include a plug.

The power conversion device 100 includes a converter 110 connected to the main battery 210, and an inverter 120 connected to the converter 10 and performing inter-conversion between DC and AC. The converter 110 in the illustrated example steps up a DC voltage (input voltage) of the main battery 210 in the range of about 200 V to 300 V to about 400 V to 700 V during running of the vehicle 200, and supplies the stepped-up voltage to the inverter 120. During regeneration, the converter 110 steps down a DC voltage (input voltage), which is output from the motor 220 through the inverter 120, to a DC voltage adapted for the main battery 210 for charging into the main battery 210. The inverter 120 converts the DC stepped up by the converter 110 to a predetermined AC and supplies the AC to the motor 220 during running of the vehicle 200. During regeneration, the inverter 120 converts an AC output from the motor 220 to a DC and outputs the DC to the converter 110.

Figure 9:
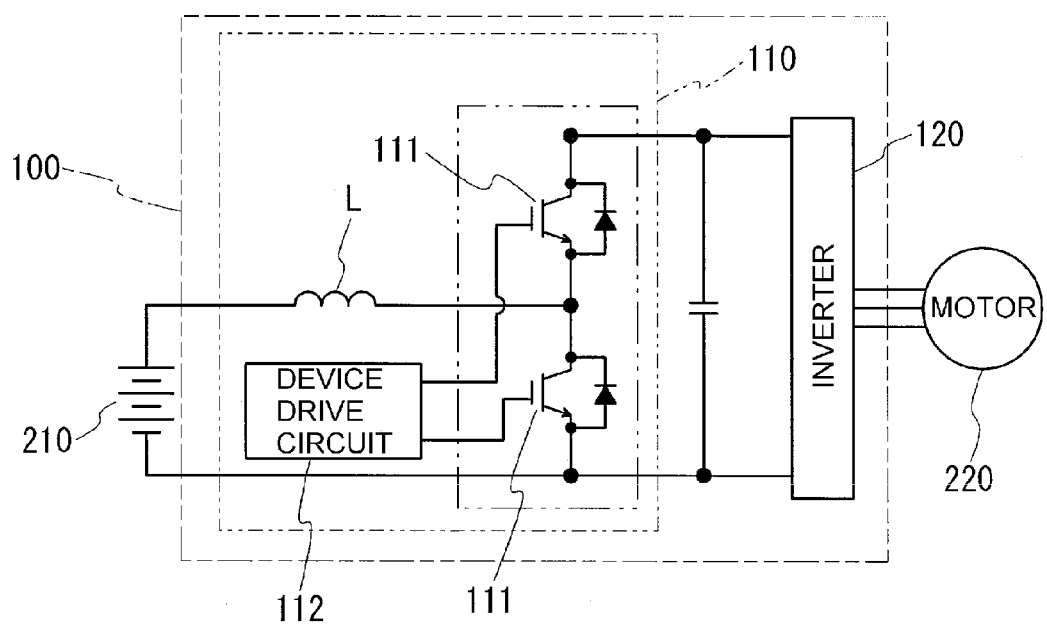
FIG. 9 is a schematic circuit diagram illustrating one example of a power conversion device of the present invention, which includes a converter of the present invention.

As illustrated in FIG. 9, the converter 110 includes a plurality of switching elements 111, a drive circuit 112 for controlling operations of the switching elements 111, and a reactor L, to thereby perform conversion (here, stepping-up and -down) of an input voltage with ON/OFF repetitions (i.e., switching operations). Power devices, such as Field Effect Transistors (FETs) or Insulated Gate Bipolar Transistors (IGBTs), are used as the switching elements 111. The reactor L has the function of, when a current is going to be increased and decreased with the switching operations, smoothing change of the current by utilizing the properties of a coil, which act to impede the change of the current going to flow through a circuit. One of the reactors 1A and 1B of Embodiments I and II and the reactors including the coil component 2B of Embodiments 2 and 4, etc., is used as the reactor L. Because of including one of those reactors having the good assembly workability, the power conversion device 100 and the converter 110 can contribute to improving productivity.

In addition to the converter 110, the vehicle 200 includes a power-feeder converter 150 connected to the main battery 210, and an auxiliary power-supply converter 160, which is connected to an auxiliary battery 230, serving as a power source for auxiliaries 240, and further connected to the main battery 210, and which converts a high voltage of the main battery 210 to a low voltage. The converter 110 typically performs DC-DC conversion, while the power feeder-converter 150 and the auxiliary power-supply converter 160 perform AC-DC conversion. The power-feeder converter 150 may perform DC-DC conversion in some cases. Reactors constructed similarly to the reactors 1A and 1B of Embodiments I and II, etc. and having sizes and shapes, which are modified as appropriate, can be utilized as reactors in the power-feeder converter 150 and the auxiliary power-supply converter 160. Furthermore, any of the reactors 1A and 1B of Embodiments I and II, etc. can be utilized in a converter for converting an input power, specifically a converter for performing only the stepping-up operation or a converter for performing only the stepping-down operation.

It is to be noted that the present invention is not limited to the above-described embodiments, and that the present invention can be modified as required without departing from the gist of the invention.

INDUSTRIAL APPLICABILITY

The reactor of the present invention can be suitably employed as various reactors (including a vehicle-loaded component, a component in power generating or transforming equipment, etc.). In particular, the reactor of the present invention can be employed as a component of a power conversion device, such as a DC-DC converter, which is mounted on a vehicle, e.g., a hybrid car, an electric car, or a fuel cell car. The converter of the present invention and the power conversion device of the present invention can be applied to a variety of uses including vehicles, power generating or transforming equipment, etc. The coil component of the present invention can be suitably employed as a component of the reactor of the present invention.

REFERENCE SIGNS LIST 1A, 1B reactors 2A, 2B, 2C coil components
2 coil 2w wire 20 resin molded portion 20e end surface
21 semicircular arc portion 22 linear portion
3 magnetic core 31 inner core portion 31e end surface 32 outer core portion
4A, 4B cases 41 bottom wall 41i inner bottom surface
410 outer bottom surface 42 sidewall 43 pedestal
44 coil groove 45 mounting portion 45h bolt hole
5 insulating tube
100 power conversion device 110 converter 111 switching element
112 drive circuit
120 inverter 150 power-feeder converter 160 auxiliary power-supply converter
200 vehicle 210 main battery 220 motor 230 auxiliary battery
240 auxiliaries
250 wheel

The invention claimed is:

1. A reactor including a magnetic core arranged inside and outside a coil, the reactor comprising:
   one coil formed by spirally winding a wire;
   an inner core portion constituting one part of the magnetic core and inserted within the coil;
   a resin molded portion made of an insulating resin and covering at least a part of a surface of the coil, and holding the coil and the inner core portion integrally with each other; and
   an outer core portion constituting the other part of the magnetic core and disposed around the coil to form a closed magnetic circuit in cooperation with the inner core portion,
   wherein the resin molded portion holds the coil in a state compressed from a free-length state,
   wherein at least a part of the outer core portion is made of a mixture containing magnetic powder and resin,
   wherein the coil is housed in a case such that an axis of the coil is positioned parallel to an outer bottom surface of a case, and
   wherein a coil groove is formed in an inner bottom surface of the case.

2. The reactor according to claim 1, wherein at least one end surface of the inner core portion is covered with a resin constituting the resin molded portion.

3. The reactor according to claim 1, wherein lead-out portions of the wire, which are led out from a turn forming portion of the coil, are covered with insulating tubes in regions where the lead-out portions are contacted with the outer core portion.

4. The reactor according to claim 1, wherein the inner core portion is formed of a powder compact.

5. A converter comprising a switching element, a drive circuit for controlling operation of the switching element, and a reactor for smoothing the switching operation, the converter converting an input voltage with the operation of the switching element,
   wherein the reactor is the reactor according to claim 1.

6. A power conversion device comprising a converter for converting an input voltage, and an inverter connected to the converter and inter-converting a direct current and an alternating current, the power conversion device driving a load with electric power converted by the inverter,
   wherein the converter is the converter according to claim 5.

7. The reactor according to claim 3, wherein the insulating tubes are heat-shrinkable tubes or room-temperature shrinkable tubes.

* * * * *